US008947686B2

(12) United States Patent
Araki

(10) Patent No.: US 8,947,686 B2
(45) Date of Patent: Feb. 3, 2015

(54) PRINTING APPARATUS AND PRINTING METHOD

(75) Inventor: Ato Araki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 222 days.

(21) Appl. No.: 13/489,853

(22) Filed: Jun. 6, 2012

(65) Prior Publication Data

US 2012/0314237 A1 Dec. 13, 2012

(30) Foreign Application Priority Data

Jun. 8, 2011 (JP) .................................. 2011-128555

(51) Int. Cl.
*G06F 3/12* (2006.01)
*G06K 15/02* (2006.01)
*G06K 15/00* (2006.01)

(52) U.S. Cl.
CPC .......... *G06K 15/1857* (2013.01); *G06K 15/402* (2013.01); *G06K 15/1807* (2013.01)
USPC ........................................................ 358/1.13

(58) Field of Classification Search
CPC ........................ G06K 15/1807; G06K 15/1857
See application file for complete search history.

(56) References Cited

U.S. PATENT DOCUMENTS

2012/0019860 A1 1/2012 Fujiwara

FOREIGN PATENT DOCUMENTS

| JP | 2002-254763 | 9/2002 |
| JP | 2004-287519 | 10/2004 |
| JP | 2006-154342 | 6/2006 |

*Primary Examiner* — Saeid Ebrahimi Dehkordy
*Assistant Examiner* — Lennin Rodriguezgonzale
(74) *Attorney, Agent, or Firm* — Oblon, Spivak, McClelland, Maier & Neustadt, L.L.P.

(57) ABSTRACT

A printing apparatus includes a controller; and an engine including a first printing unit and a second printing unit. Each of the first and second printing units includes a data management unit configured to manage a piece of image data transferred from an upper level apparatus, one or more output units, and an output control unit configured to output an image based on the piece of image data to one of the one or more output units. The controller is configured to receive control information indicating a printing condition from the upper level apparatus, produce print management tables for the respective pieces of image data, on the basis of the control information, cause the upper level apparatus to transfer the pieces of image data to the data management units on the basis of the print management tables, respectively.

5 Claims, 21 Drawing Sheets

FIG.9

| No | CLASSIFICATION | NAME | DIRECTION (DFE⇔MIC) | CONTENT |
|---|---|---|---|---|
| 1 | JOB INFORMATION | JOB START | ⇔ | NOTIFICATION OF JOB START/RESPONSE JOB IDENTIFIER (jobId) COMMUNICATION |
| 2 | | JOB END | ⇔ | NOTIFICATION OF COMPLETION OF ALL PRINTING PROCESSES REQUESTED BY CORRESPONDING JOB/RESPONSE JOB IDENTIFIER (jobId) COMMUNICATION |
| 3 | | PRINTING PROCESS RECEPTION START | ↓ | NOTIFY THAT PRINTER CAN RECEIVE PRINTING PROCESS |
| 4 | | PRINTER INFORMATION REQUEST/NOTIFICATION | ⇔ | NEEDED PRINTER INFORMATION REQUEST/NOTIFICATION |
| 5 | | PRINTING PROCESS START | ⇔ | NOTIFY THAT IMAGE DATA IS PREPARED/RESPONSE OUTPUT ORDER, PAGE (PROCESS) UNIT |
| 6 | PRINTER STATUS/ PRINTING PROCESS | PRINTING PROCESS REQUEST | ⇔ | PRINTER CONTROLLER REQUEST PRINTING PROCESS/RESPONSE COLOR, PROCESS IDENTIFICATION NUMBER, PLANE IDENTIFICATION NUMBER PLANE UNIT, REQUEST IN REQUEST ORDER OF ENGINE *BIT MAP DATA IS RETRIEVED FROM ENGINE |
| 7 | | DATA TRANSFER COMPLETION | ↑ | NOTIFY TRANSFER COMPLETION OF REQUESTED PLANE |
| 8 | | DATA RECEPTION COMPLETION | ↓ | NOTIFY PLANE RECEPTION COMPLETION OF REQUESTED PLANE |
| 9 | | PRINTING PROCESS COMPLETION | ↑ | PRINTING REQUESTS FOR ALL PAGES (PROCESSES) ARE COMPLETE |
| 10 | | PROCESS STATUS REPORT | ↓ | NOTIFY PRINTING STATUS OF PROCESS ·FEEDING ·DISCHARGING ·PRINTING START |
| 11 | | SC NOTIFICATION | ⇔ | ACQUIRE/NOTIFY PRINTER TROUBLE INFORMATION |
| | | ERROR OCCURRENCE/ CANCELLATION | ↑ | NOTIFY ERROR OCCURRENCE/REMOVAL OF UPPER LEVEL APPARATUS |
| 12 | PRINTING CONDITION | PRINTING CONDITION SETTING | ⇔ | NOTIFICATION OF PRINTING CONDITION/RESPONSE ·PRINTING TYPE (IMAGE DATA EXISTS/BLANK PAGE) ·FEEDING AND DISCHARGING INFORMATION (FEEDING SOURCE/ DISCHARGING DESTINATION) ·PRINTING PAPER SIZE ·IMAGE DATA SIZE ·RESOLUTION AND TONE ·COLOR INFORMATION ·NUMBER OF COPIES ETC. |
| 13 | CONNECTION | REGISTRATION/ CANCELLATION | ⇔ | MUTUAL REGISTRATION OF UPPER LEVEL APPARATUS AND PRINTER CONTROLLER |

FIG.10

| No | CLASSIFICATION | CONTENT | | SETTING CONTENT |
|---|---|---|---|---|
| 1 | COMMON | PBID | | PAGE IDENTIFIER |
| 2 | | PRINTING FORMAT | | SET ONE-UP OR TWO-UP |
| 3 | | COPY COUNT | | SET NUMBER OF COPIES HAVING BEEN PRODUCED |
| 4 | | NUMBER OF COPIES | | SET NUMBER OF COPIES TO BE PRODUCED |
| 5 | | DATA AMOUNT PER PAGE | | NUMBER OF COLORS (MONOCHROME: 1, FULL COLOR: 4) |
| 6 | | IMAGE OUTPUT DESTINATION | | DESIGNATE PRINTING UNIT TO WHICH DATA IS TRANSFERRED |
| 7 | | FOR DATA TRANSFER | | |
| 8 | | | DATA TRANSFER SOURCE ADDRESS | |
| 9 | | | x SIZE | INCLUDE BOUNDARY ADJUSTMENT AREA, BYTE SIZE |
| 10 | | | INCREMENT SIZE | |
| 11 | | | NUMBER OF INCREMENTS | |
| 12 | | | DATA STORAGE DESTINATION ADDRESS | |
| 13 | | FOR PRINTING | | |
| 14 | | | RESOLUTION | MAIN-SCANNING: PRINT RESOLUTION |
| 15 | | | | SUB-SCANNING: PRINT RESOLUTION |
| 16 | | | TONE | NUMBER OF BITS PER PIXEL |
| 17 | | | PAPER WIDTH | NUMBER OF BITS IN MAIN-SCANNING DIRECTION |
| 18 | | | PAPER CONVEYING LENGTH | NUMBER OF BITS IN SUB-SCANNING DIRECTION |
| 19 | | | PRINT SURFACE (FRONT SURFACE/ BACK SURFACE) | PRINT SURFACE |
| 20 | | | PRINTING PROHIBITED AREA ON UPPER SIDE | PRINTING PROHIBITED AREA ON UPPER SIDE OF PAPER |
| 21 | | | PRINTING PROHIBITED AREA ON LOWER SIDE | PRINTING PROHIBITED AREA ON LOWER SIDE OF PAPER |
| 22 | | | PRINTING PROHIBITED AREA ON LEFT SIDE | PRINTING PROHIBITED AREA ON LEFT SIDE OF PAPER |
| 23 | | | PRINTING PROHIBITED AREA ON RIGHT SIDE | PRINTING PROHIBITED AREA ON RIGHT SIDE OF PAPER |
| 24 | | | IMAGE INFORMATION | |
| 25 | | | | X DIRECTION EFFECTIVE SIZE | EFFECTIVE SIZE EXCLUDING BOUNDARY ADJUSTMENT AREA |
| 26 | | | | Y DIRECTION EFFECTIVE SIZE | |
| 27 | C | COLOR IDENTIFIER | | CYAN |
| 28 | | FOR DATA TRANSFER | | |
| 29 | | | NECESSITY OF DATA TRANSFER | SET DATA TRANSFER TO "UNNECESSARY" FOR ALL COLORS IN THE CASE OF BLANK PAPER |
| 30 | | | | SET DATA TRANSFER TO "UNNECESSARY" FOR COLORS EXCLUDING COLORS IDENTIFIED BY COLOR IDENTIFIERS |
| 31 | | FOR PRINTING | | |
| 32 | | | NECESSITY OF PRINTING | SET DATA TRANSFER TO "UNNECESSARY" FOR ALL COLORS IN THE CASE OF BLANK PAPER |
| 33 | | | | SET DATA TRANSFER TO "UNNECESSARY" FOR COLORS EXCLUDING COLORS IDENTIFIED BY COLOR IDENTIFIERS |
| 34 | M | SAME AS THAT OF C (COLOR IDENTIFIER IS MAGENTA) | | |
| 35 | Y | SAME AS THAT OF C (COLOR IDENTIFIER IS YELLOW) | | |
| 36 | K | SAME AS THAT OF C (COLOR IDENTIFIER IS BLACK) | | |

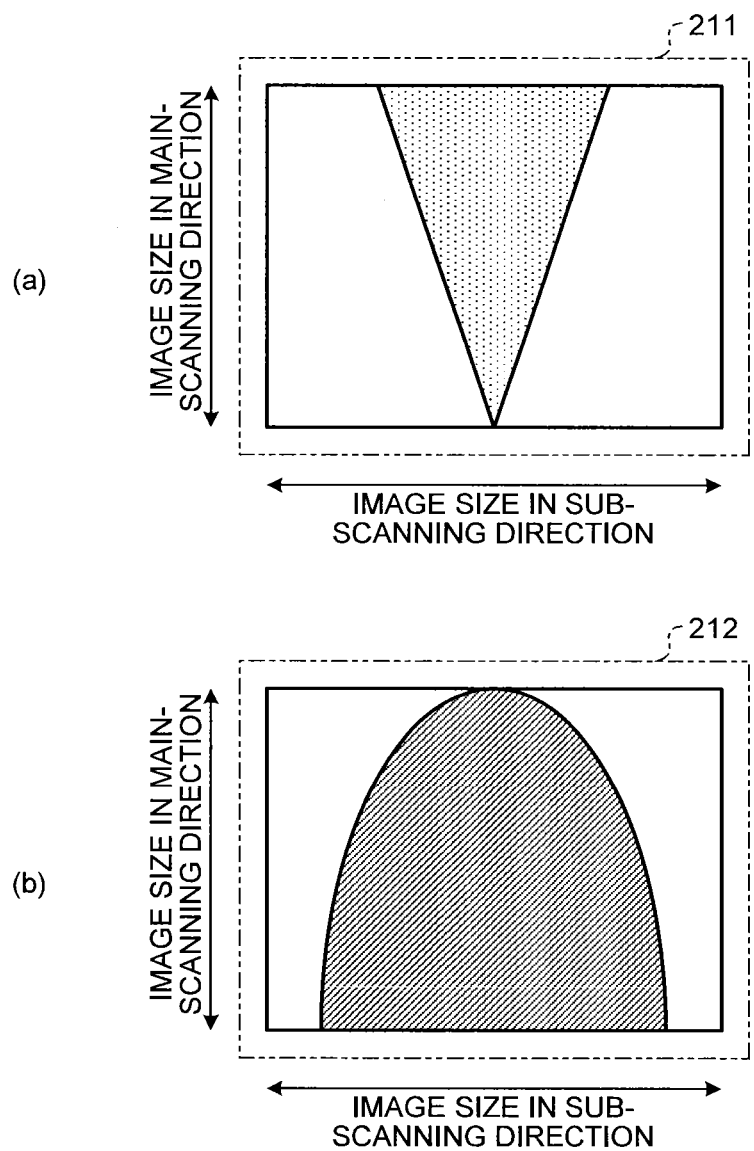

FIG.19
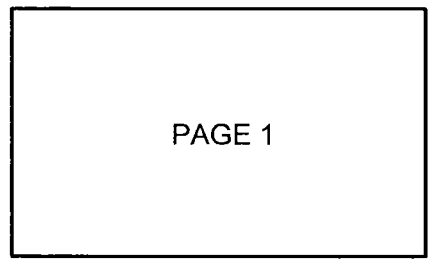
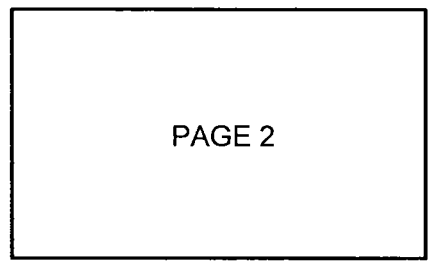
PAGE 1
PAGE 2

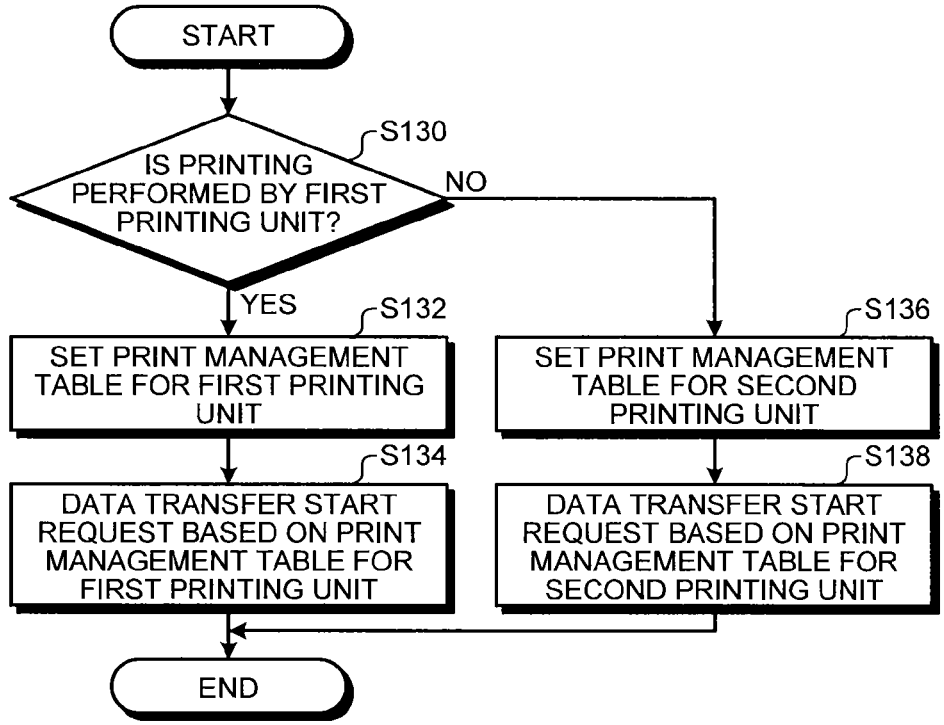
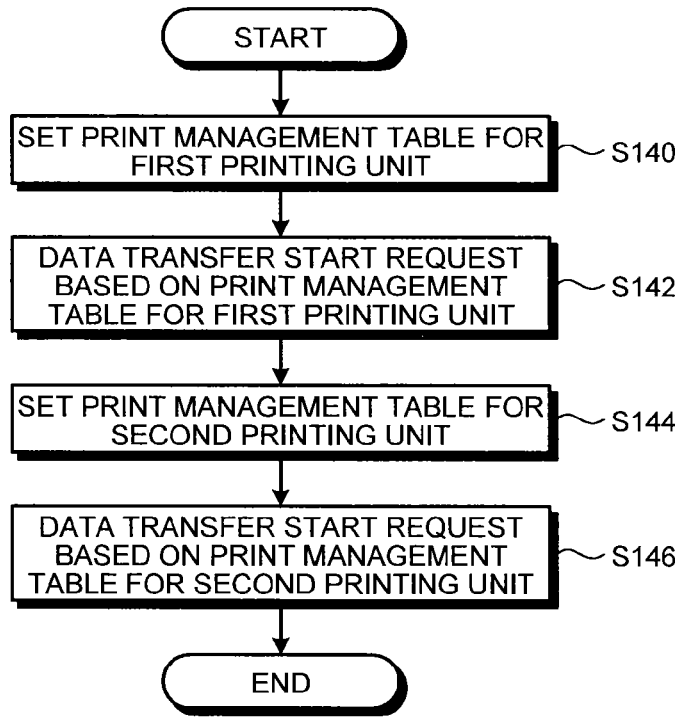

PRINTING APPARATUS AND PRINTING METHOD

CROSS-REFERENCE TO RELATED APPLICATIONS

The present application claims priority to and incorporates by reference the entire contents of Japanese Patent Application No. 2011-128555 filed in Japan on Jun. 8, 2011.

BACKGROUND OF THE INVENTION

1. Field of the Invention

The present invention relates to a printing apparatus and a printing method.

2. Description of the Related Art

There have been printing systems including upper level apparatuses producing image data and printing apparatuses printing the image data produced by the upper level apparatuses. For example, refer to Japanese Patent Application Laid-open No. 2004-287519.

In typical printing apparatuses including printer controllers transferring image data and printer engines outputting images based on the image data transferred from the printer controllers, the printer controllers and the printer engines are coupled with data lines for transferring the image data and control lines for transmitting and receiving control signals. For example, refer to Japanese Patent Application Laid-open No. 2002-254763.

If the technique disclosed in Japanese Patent Application Laid-open No. 2002-254763 is applied to the printing system disclosed in Japanese Patent Application Laid-open No. 2004-287519, image data and control signals could be exchanged in parallel between the upper level apparatus and the printing apparatus. As a result, the image data can be printed at a high speed and printing productivity can be increased.

When printing productivity needs to be further increased in such a printing system, a mechanism related to image output may be added. However, the addition of another mechanism complicates the control of data transfer from the upper level apparatus to the printing apparatus.

Therefore, there is a need for a printing apparatus and a printing method that can further increase printing productivity by simple control.

SUMMARY OF THE INVENTION

It is an object of the present invention to at least partially solve the problems in the conventional technology.

According to an embodiment, there is provided a printing apparatus that includes a controller; and an engine including a first printing unit and a second printing unit. The first printing unit includes a first data management unit configured to manage a piece of first image data transferred from an upper level apparatus; one or more first output units; and a first output control unit configured to output a first image based on the piece of first image data to one of the one or more first output units. The second printing unit includes a second data management unit configured to manage a piece of second image data transferred from the upper level apparatus; one or more second output units; and a second output control unit configured to output a second image based on the piece of second image data to one of the one or more second output units. The controller is configured to receive control information indicating a printing condition from the upper level apparatus, produce a first print management table for the piece of first image data and a second print management table for the piece of second image data, on the basis of the control information, cause the upper level apparatus to transfer the piece of first image data to the first data management unit on the basis of the first print management table, and cause the upper level apparatus to transfer the piece of second image data to the second data management unit on the basis of the second print management table.

According to another embodiment, there is provided a printing method that includes outputting to a first output unit a first image based on a piece of first image data transferred from an upper level apparatus; outputting to a second output unit a second image based on a piece of second image data transferred from the upper level apparatus; receiving control information indicating a printing condition from the upper level apparatus; producing a first print management table for the piece of first image data and a second print management table for the piece of second image data, on the basis of the control information; causing the upper level apparatus to transfer the piece of first image data to a first data management unit on the basis of the first print management table; and causing the upper level apparatus to transfer the piece of second image data to a second data management unit on the basis of the second print management table.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a table illustrating examples of control information of the embodiment;

FIG. 10 is a table illustrating an example of a print management table of the embodiment;

FIG. 12 is an explanatory view illustrating an example of a transfer technique of image data in the continuous page printing performed in the two-up format by the printing system of the embodiment;

FIG. 19 is an explanatory view illustrating a relationship between the print management tables produced in the sequence illustrated in FIGS. 16A and 16B and pages to be printed;

FIG. 23 is a flowchart illustrating an example of print management table setting process performed by the print control unit of the embodiment; and FIG. 24 is a flowchart illustrating another example of the print management table setting process performed by the print control unit of the embodiment.

DETAILED DESCRIPTION OF THE PREFERRED EMBODIMENT

An embodiment of a printing apparatus and a printing method according to the present invention will be described in detail below with reference to the accompanying drawings. The printing apparatus described in the following embodiment forms images on printing paper through inkjet printing. The printing method, however, is not limited to the inkjet printing.

Overview

An overview of production printing to which a printing system including a printing apparatus according to the embodiment is applied is described below.

The basic idea of the production printing is to perform massive printing in a short period of time. Therefore, in the production printing, a work flow system from creating print data to distributing the print is established in order to effectively manage print jobs and print data and to achieve high speed printing.

The printing system according to the embodiment relates to the execution of printing in the work flow of production printing. In the printing system, a process executed by a raster image processor (RIP) (also referred to as RIP process) and printing of the image data (bit map data) produced by the RIP process are performed by different apparatuses. Higher printing speed can be achieved by using different apparatuses for executing the RIP process and the printing process because the RIP process requires a long processing time within the printing process.

Hereinafter, an example will be described in which the printing system of the embodiment executes color printing. The type of printing, however, is not limited to color printing. For example, monochrome printing may be executed by the printing system.

Structure

A structure of the printing system of the embodiment will be described below.

Figure 1:
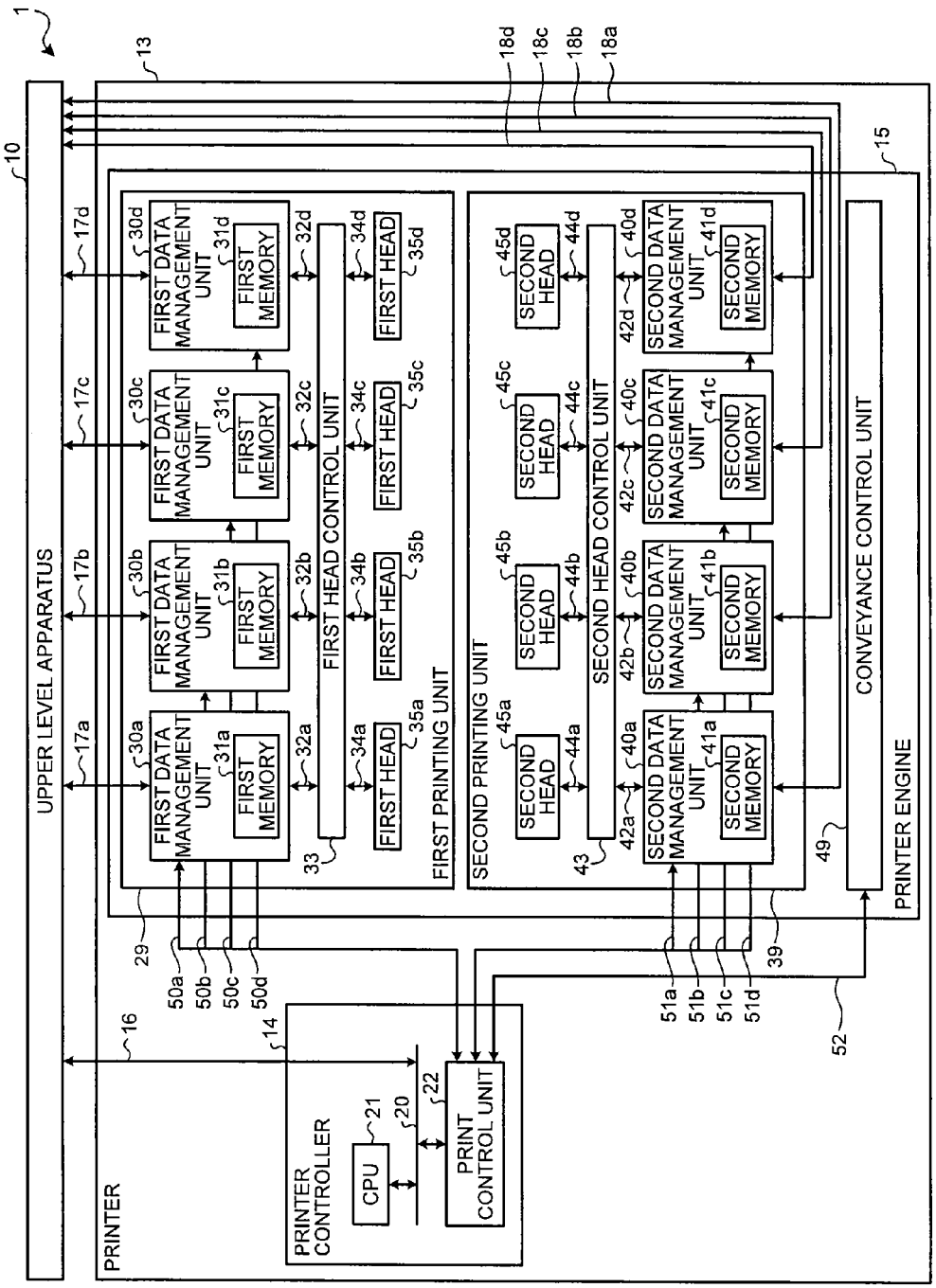
FIG. 1 is a block diagram illustrating an exemplary structure of a printing system of an embodiment of the present invention.

FIG. 1 is a block diagram illustrating an exemplary structure of a printing system 1 of the embodiment. As illustrated in FIG. 1, the printing system 1 includes an upper level apparatus 10, a printer 13 including a printer controller 14 and a printer engine 15, a control line 16 that connects the upper level apparatus 10 and the printer controller 14 of the printer 13, and data lines 17a to 17d and 18a to 18d that connect the upper level apparatus 10 and the printer engine 15 of the printer 13.

The upper level apparatus 10 executes the RIP process in accordance with print job data supplied from a host apparatus (not illustrated) and produces image data (bit map data) of each color for printing. In addition, the upper level apparatus 10 produces control information for controlling a printing operation on the basis of the print job data and information supplied from the host apparatus.

The printer controller 14 of the printer 13 receives the control information from the upper level apparatus 10 through the control line 16. The printer controller 14 also produces control information and transmits the control information to the upper level apparatus 10 through the control line 16. The image data of each color produced by the upper level apparatus 10 is supplied to the printer engine 15 by transmitting and receiving the control information between the printer controller 14 and the upper level apparatus 10 through the data lines 17a to 17d and 18a to 18d. That is, the printer controller 14 controls the printer engine 15 of the printer 13 on the basis of the transmitted and received control information and causes the printer engine 15 to execute printing in accordance with the print job. The details of the control information will be described later.

In the embodiment, continuous form paper (e.g., fan-fold paper, sprocket feed paper), which is continuous paper provided at predetermined intervals with perforations enabling the paper to be cut into separate sheets, is used as the printing paper. In the production printing, the continuous form paper is often used as the printing paper. In the embodiment, the continuous form paper is exemplarily used as the printing paper. The printing paper is not limited to the continuous from paper. A cut paper having a fixed size, such as A4 size or B4 size, may be used as the printing paper.

Figure 2:
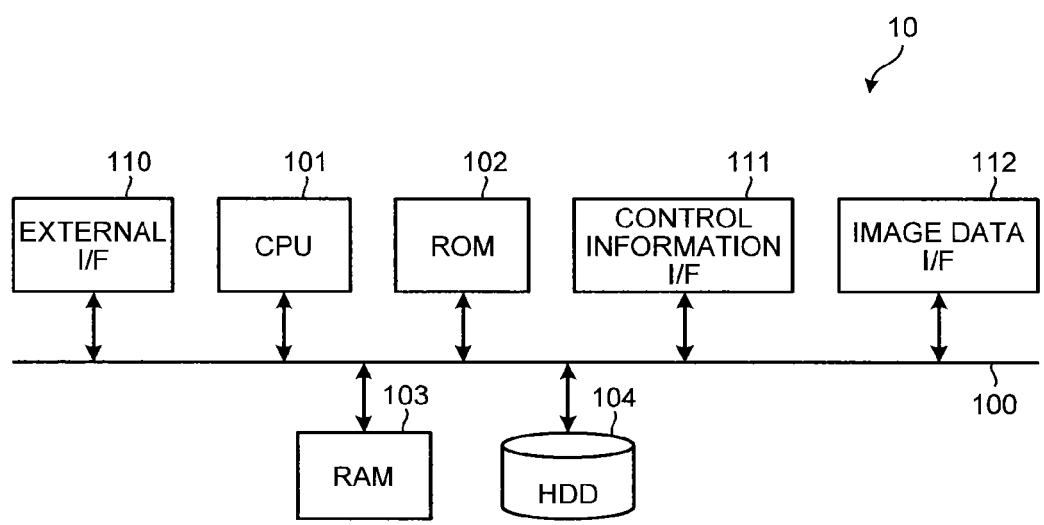
FIG. 2 is a block diagram illustrating an example of a hardware structure of an upper level apparatus according to the embodiment.

FIG. 2 is a block diagram illustrating an example of a hardware structure of the upper level apparatus 10 according to the embodiment. As illustrated in FIG. 2, the upper level apparatus 10 includes a bus 100, a central processing unit (CPU) 101, a read only memory (ROM) 102, a random access memory (RAM) 103, a hard disk drive (HDD) 104, an external interface (I/F) 110, a control information I/F 111, and an image data I/F 112. The components of the upper level apparatus 10 are connected to the bus 100, through which they can communicate with each other.

Programs for operating the CPU 101 are preliminarily stored in the ROM 102 and the HDD 104. The RAM 103 is used as a working memory of the CPU 101. The CPU 101 controls the overall operation of the upper level apparatus 10 in accordance with the programs stored in the ROM 102 and the HDD 104 using the RAM 103 as the working memory.

The external I/F 110 controls communications with the host apparatus in accordance with transmission control protocol/Internet protocol (TCP/IP), for example. The image data I/F 112 controls communications of image data and has multiple channels. For example, image data of each color of Y (yellow), C (cyan), M (magenta), and K (black) produced by the upper level apparatus 10 is output from the channels. The image data I/F 112 uses peripheral component interconnect bus express (PCI Express), for example, to achieve a high transfer speed. The interface, however, is not limited to PCI Express. The control information I/F 111 controls communications of the control information. The interface used for the control information I/F 111 is not limited any specific interface. In the embodiment, in the same manner as the image data I/F 112, the PCI Express is used for the control information I/F 111.

In the upper level apparatus 10 thus structured, the external I/F 110 receives print job data transmitted from the host apparatus. The CPU 101 stores the print job data received by the external I/F 110 in the HDD 104. The CPU 101 reads out the print job data from the HDD 104, executes the RIP process in accordance with the read out print job data, and produces the image data (bit map image) of each color and writes the data in the RAM 103. For example, the CPU 101 renders page description language (PDL) data by the RIP process and writes the bit map data of each color in the RAM 103. The CPU 101 compresses and encodes the image data of each color written in the RAM 103 and temporarily stores the compressed and encoded image data in the HDD 104. The CPU 101 reads out the compressed and encoded image data of each color from the HDD 104, decodes the compressed codes, and writes the decompressed image data of each color in the RAM 103 when the printer 13 starts a printing operation, for example. The CPU 101 reads out the image data of each color from the RAM 103, and causes the image data I/F 112 to output the image data of each color from each channel of the image data I/F 112 so as to supply the image data to the printer engine 15 of the printer 13 trough the data lines 17a to 17d and 18a to 18d. The CPU 101 transmits and receives the control information between itself and the printer controller 14 of the printer 13 through the control information I/F 111 and the control line 16 in accordance with the progress of the printing operation.

Referring back to FIG. 1, the printer controller 14 controls the printing operation of the printer engine 15 by transmitting and receiving the control information between itself and the upper level apparatus 10 through the control line 16. The printer controller 14 includes a bus 20, a CPU 21, and a print control unit 22. The CPU 21 and the print control unit 22 are connected to the bus 20, through which they can communicate with each other. The control line 16 is coupled to the bus 20 through a communication I/F (not illustrated).

The CPU 21 operates in accordance with a program stored in a ROM (not illustrated) and controls the overall operation of the printer 13. Engine control lines 50a to 50d and 51a to 51d are connected to the print control unit 22. The print control unit 22 receives the control information from the upper level apparatus 10 through the control line 16 and produces a print management table on the basis of the received control information, which will be described later in detail. The print control unit 22 controls the operation of the printer engine 15 by transmitting and receiving instructions and status information between itself and the printer engine 15 through the engine control lines 50a to 50d and 51a to 51d on the basis of the produced print management table and the control information transmitted and received between itself and the upper level apparatus 10. The print management table will be described in more detail later.

The data lines 17a to 17d and 18a to 18d are connected to the printer engine 15. The printer engine 15 executes printing processing of the image data of each color transferred from the upper level apparatus 10 through the data lines 17a to 17d and 18a to 18d in accordance with the control of the printer controller 14. The printer engine 15 includes a first printing unit 29, a second printing unit 39, and a conveyance control unit 49.

The first printing unit 29 prints an image based on the image data of each color transferred from the upper level apparatus 10 on the printing paper. The first printing unit 29 includes first data management units 30a to 30d, a first head control unit 33 (may be referred to as a first output control unit), output lines 32a to 32d that connect the first data management units 30a to 30d, respectively, to the first head control unit 33, first heads 35a to 35d (may be referred to as output units), and output lines 34a to 34d that connect the first heads 35a to 35d, respectively, to the first head control unit 33. The data lines 17a, 17b, 17c, and 17d and the engine control lines 50a, 50b, 50c, and 50d are connected to the first data management units 30a, 30b, 30c, and 30d, respectively. The first data management units 30a, 30b, 30c, and 30d include first memories 31a, 31b, 31c, and 31d, respectively.

The second printing unit 39 prints an image based on the image data of each color transferred from the upper level apparatus 10 on the printing paper. The second printing unit 39 includes second data management units 40a to 40d, a second head control unit 43 (may be referred to as a second output control unit), output lines 42a to 42d that connect the second data management units 40a to 40d, respectively, to the second head control unit 43, second heads 45a to 45d (may be referred to as second output units), and output lines 44a to 44d that connect the second heads 45a to 45d, respectively, to the second head control unit 43. The data lines 18a, 18b, 18c, and 18d, and the engine control lines 51a, 51b, 51c, and 51d are connected to the second data management units 40a, 40b, 40c, and 40d, respectively. The second data management units 40a, 40b, 40c, and 40d include second memories 41a, 41b, 41c, and 41d, respectively.

In this way, the first printing unit 29 and the second printing unit 39 have common components and also operate in the same manner. In the embodiment, the components of the first printing unit 29 are mainly described, while the description of the components of the second printing unit 39 is omitted unless they need to be described.

The first data management units 30a, 30b, 30c, and 30d store image data transferred from the upper level apparatus 10 through the data lines 17a, 17b, 17c, and 17d in the first memories 31a, 31b, 31c, and 31d, respectively, and manage the stored image data. In addition, the first data management units 30a, 30b, 30c, and 30d transmit and receive the control signals between themselves and the print control unit 22 through the engine control lines 50a, 50b, 50c, and 50d, respectively.

Each of the first data management units 30a, 30b, 30c, and 30d includes a logic circuit (not illustrated). In the embodiment, only the logic circuit of the first data management unit 30a will be exemplarily described because each logic circuit of the first data management units 30a to 30d controls operation in the same manner as the logic circuit of the first data management unit 30a. The logic circuit of the first data management unit 30a stores the image data transferred from the upper level apparatus 10 through the data line 17a in the first memory 31a in accordance with the control signal received from the print control unit 22 through the engine control line 50a. The logic circuit of the first data management unit 30a reads out the image data from the first memory 31a in accordance with the control signal received from the print control unit 22 through the engine control line 50a and supplies the read image data to the first head control unit 33 through the output line 32a.

Each logic circuit of the first data management units 30a to 30d, which is structured as hardware by combining logic circuits, makes logical operations on the control signal composed of bit strings received from the print control unit 22 to thus determine processes to be executed, for example. The control using logic circuits has some advantages. For example, processing can be branched by interrupting the program and higher speed processing can be achieved than the speed possibly achieved by control using a CPU.

The first head control unit 33 controls the connection between the first data management units 30a to 30d and the first heads 35a to 35d. The first head control unit 33, by controlling the connection between the output lines 32a to 32d and the output lines 34a to 34d, supplies the image data supplied from the first data management units 30a to 30d to any of the first heads 35a to 35d and causes the first heads to output the image based on the supplied image data on the printing paper.

In the embodiment, the first head control unit 33 controls the output lines 32a to 32d and the output lines 34a to 34d such that they are connected one-to-one. Specifically, the first head control unit 33 controls the output lines (sets pathways) such that the first data management units 30a to 30d and the first heads 35a to 35d are connected so as to correspond to each other. The connection manner, however, is not limited to this manner. For example, the first head control unit 33 may control the output lines such that the first data management units 30a to 30d and the first heads 35a to 35d are connected in a one-to-many relationship.

In the embodiment, the first head control unit 33 controls the connection between the first data management units 30a to 30d and the first heads 35a to 35d on the basis of user operation using a dip switch, for example. The control manner, however, is not limited to the user operation using the dip switch. The first head control unit 33 may control the connection between the first data management units 30a to 30d and the first heads 35a to 35d on the basis of the control signal (not illustrated) from the print control unit 22.

The first heads 35a to 35d eject ink in accordance with the image data supplied from the first head control unit 33 and output an image based on the image data on the printing paper. Likewise, the second heads 45a to 45d eject ink in accordance with the image data supplied from the second head control unit 43 and output an image based on the image data on the printing paper.

Figure 3:
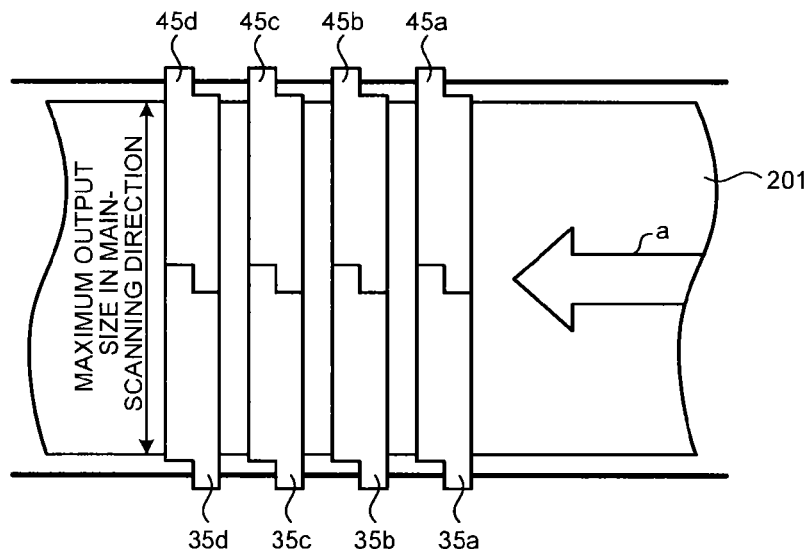
FIG. 3 is a schematic illustrating an example of an arrangement of first heads and second heads of the embodiment.

FIG. 3 is a schematic illustrating an exemplary arrangement of the first heads 35a to 35d and the second heads 45a to 45d of the embodiment. In the following description, any one of the first heads 35a to 35b is referred to as the first head 35 when the first heads 35a to 35b do not need to be differentiated from each other, while any one of the second heads 45a to 45d is referred to as the second head 45 when the second heads 45a to 45b do not need to be differentiated from each other.

Figure 4:
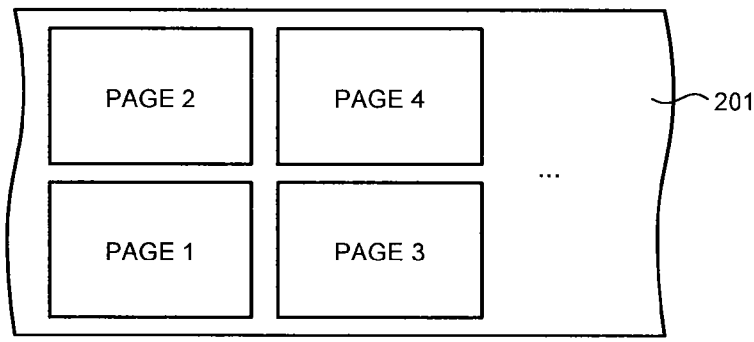
FIG. 4 is an explanatory view illustrating an example of continuous page printing performed in a two-up format by a first printing unit and a second printing unit of the embodiment.
Figure 5:
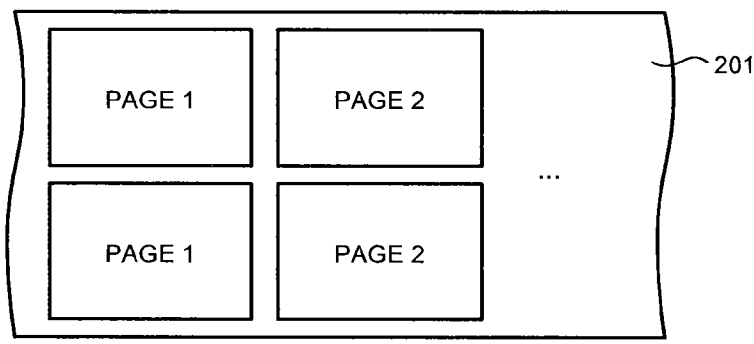
FIG. 5 is an explanatory view illustrating an example of copy page printing performed in the two-up format by the first printing unit and the second printing unit of the embodiment.
Figure 6:
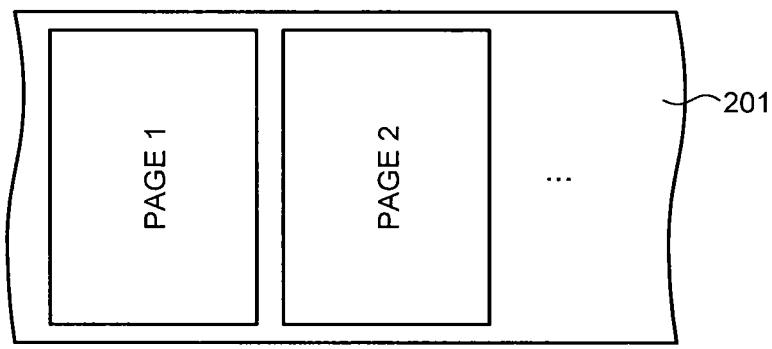
FIG. 6 is an explanatory view illustrating an example of the continuous page printing performed in a one-up format by the first printing unit and the second printing unit of the embodiment.

In the embodiment, as illustrated in FIG. 3, the first heads 35a to 35d are connected in series to the second heads 45a to 45d, respectively. Each of the first head 35 and the second head 45, which are connected in series, is disposed in parallel with a conveying direction a of printing paper 201. Accordingly, a maximum output size in a main-scanning direction of the printer engine 15 of the embodiment is the sum of the maximum output size of the first head 35 in the main-scanning direction and the maximum output size of the second head 45 in the main-scanning direction. In the embodiment, the arrangement of the first head 35 and the second head 45, as described above, enables the printer 13 to perform various types of printing as illustrated in FIGS. 4 to 6. FIG. 4 illustrates continuous page printing by two-up printing (page layout printing). FIG. 5 illustrates copy page printing by the two-up printing. FIG. 6 illustrates the continuous page printing by one-up printing (normal printing). In the copy page printing illustrated in FIG. 5, two copies are printed for each page because the number of copies is two. The detail of each printing will be described later. Although the description is omitted in the embodiment, the printer 13, of course, can perform the copy page printing by the one-up printing.

Figure 7:
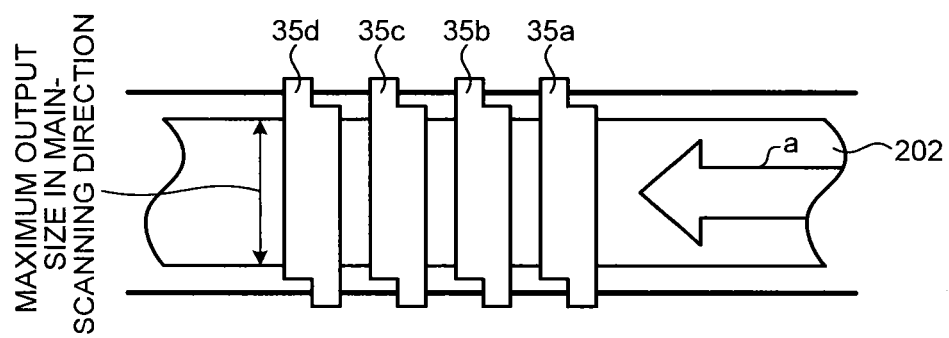
FIG. 7 is a schematic illustrating an example of an arrangement using only the first heads of the embodiment.
Figure 8:
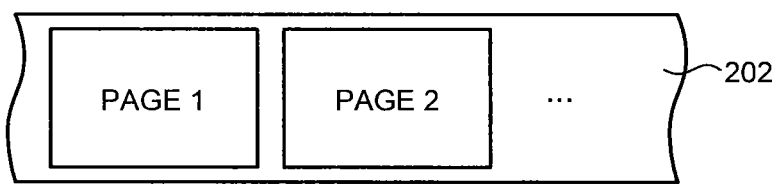
FIG. 8 is an explanatory view illustrating an example of the continuous page printing performed in the one-up format by only the first printing unit of the embodiment.

In the embodiment, the second printing unit 39 is attached to the printer engine 15 in a detachable manner. Accordingly, output of images is also possible by solely arranging the first heads 35a to 35d as illustrated in FIG. 7. In this case, the maximum output size of the printer engine 15 in the main-scanning direction is equal to the maximum output size of the first head 35 in the main-scanning direction. When the second printing unit 39 is removed from the printer engine 15, the printer 13 can perform, as illustrated in FIG. 8, the continuous page printing by the one-up printing and the copy page printing (not illustrated) by the one-up printing on printing paper 202 conveyed in the conveying direction a.

Referring back to FIG. 1, the conveyance control unit 49 is coupled to the print control unit 22 by a conveyance control line 52 and controls conveying the printing paper on which images are printed by the first printing unit 29 and the second printing unit 39.

Control Information

FIG. 9 is a table illustrating the examples of the control information of the embodiment. As illustrated in FIG. 9, the control information is roughly classified into the following four types of information: (1) job information, (2) information indicating a printer status and a printing process, (3) information indicating a printing condition, and (4) information indicating a connection status.

The job information indicates notifications of a job start and a job end. The job start includes a notification of the job start from the upper level apparatus 10 to the printer controller 14 and a response to the notification from the printer controller 14 to the upper level apparatus 10. The job end includes a notification of the completion of all of the printing processes requested by the job start from the upper level apparatus 10 to the printer controller 14 and a response to the notification from the printer controller 14 to the upper level apparatus 10. The responses from the printer controller 14 to the upper level apparatus 10 at the job start and the job end include job identifiers (jobIDs) to identify the jobs.

The information indicating the printer status and the printing process includes notifications of a printing process reception start, a request/notification of printer information, a printing process start, a printing process request, a data transfer completion, a data reception completion, a printing process completion, a process status report, a service control (SC), and an error occurrence and removal.

The printing process reception start notifies the upper level apparatus 10 that the printer controller 14 is ready for receiving a printing process.

The request/notification of printer information includes a request from the upper level apparatus 10 to the printer controller 14 for necessary printer information and a response from the printer controller 14 to the upper level apparatus 10 to the request.

The printing process start includes a notification from the upper level apparatus 10 to the printer controller 14 of the completion of image data preparation and a response from the printer controller 14 to the upper level apparatus 10 to the notification. The notification of the completion of the image data preparation is performed on an output order of the image data basis and on a page (process) basis. The page is a printing unit by which a series of printing operations is performed.

The printing process request is a notification of a printing process from the printer controller 14 to the upper level apparatus 10 and a response from the upper level apparatus 10 to the printer controller 14 to the notification. Upon receiving the printing process request, the printer controller 14 notifies the upper level apparatus 10 of color information (Yellow, Cyan, Magenta, and Black) indicating each color of C, M, Y, and K for printing, a process identification number (processID), and a plane identification number. The plane corresponds to each image based on each color to be printed in one page. The printer controller 14 notifies the upper level apparatus 10 of the these kinds of information for every plane in accordance with the order of request of the printer engine 15, that is, the first data management units 30a, 30b, 30c, and 30d. In other words, the printer engine 15 retrieves the image data (bit map data) from the upper level apparatus 10.

The data transfer completion is a notification from the upper level apparatus 10 to the printer controller 14 of the completion of transferring the image data of the requested plane.

The data reception completion is a notification from the printer controller 14 to the upper level apparatus 10 of the completion of receiving the image data of the requested plane.

The printing process completion is a notification from the upper level apparatus 10 to the printer controller 14 of the completion of printing request for all pages (processes).

The process status report is a notification from the printer controller 14 to the upper level apparatus 10 of a print status of a page (process). The printer controller 14 acquires information relating to feeding papers, discharging papers, and a print start from the printer engine 15 and transmits the acquired information to the upper level apparatus 10 by adding the information to the process status report.

The SC notification includes a request from the upper level apparatus 10 to the printer controller 14 for acquisition of trouble information of the printer 13 and notification from the printer controller 14 to the upper level apparatus 10 of the acquired trouble information for the request.

The error occurrence and removal is a notification from the upper level apparatus 10 to the printer controller 14 of error occurrence in the upper level apparatus 10 and removal of the error.

The information indicating the printing condition is information with regard to the setting of printing conditions. Specifically, the information includes a notification from the upper level apparatus 10 to the printer controller 14 of the printing conditions and a response from the printer controller 14 to the notification. Examples of the printing conditions include a printing type, feeding and discharging information, a printing paper size, an image data size, resolution and tone, color information, and the number of copies.

The printing type indicates whether image data exists and is to be printed or whether no image data exists and a blank page is to be output. The feeding and discharging information indicates identification information such as a feeding source of the printing paper or a stacker at a discharging destination. The printing paper size indicates the length of the width of the printing paper and the length of a page to be printed in the conveying direction of the printing paper when continuous form paper is used as the printing paper, for example. The print data size indicates a size of image data including a boundary adjustment size, for example. The resolution and tone indicate the resolution and the tone when image data is printed on the printing paper. The color information indicates whether full color printing using colors C, M, Y, and K is performed or single color (monochrome) printing using color K only is performed. The number of copies indicates the number of copies of a page to be printed.

The information indicating the connection status is a notification of registration or cancellation. The upper level apparatus 10 and the printer controller 14 individually register each other's information and cancel each other's registered information.

Print Management Table

FIG. 10 is a table illustrating an example of the print management table of the embodiment. The print management table includes pieces of information common to colors C, M, Y, and K and information of each color. Each piece of the information includes data transfer information used when image data is transferred and print information used when the image data is output.

The pieces of information common to the colors in the print management table are described below. The pieces of information common to the colors include a PBID, a printing format, a copy count, the number of copies, a data amount per page, and an image output destination, in addition to the data transfer information and the print information. The PBID is a page identifier for identifying a print page. The print management table of the page is identified by the PBID. The printing format indicates whether the printing is in the one-up format (the above-described one-up printing) or in the two-up format (the above-described two-up printing). The copy count indicates the number of copies having been produced from the page identified by the PBID. The number of copies indicates the number of copies to be produced from the page identified by the PBID. The data amount per page indicates the number of colors used for printing the page identified by the PBID. For example, the data amount per page is "1" for monochrome printing, while the data amount per page is "4" for full color printing. The image output destination indicates the printing unit to which the image data is transferred. For example, the value of the image output destination is "1" when the destination is the first printing unit 29, while the value of the image output destination is "2" when the destination is the second printing unit 39.

The data transfer information of the information common to the colors includes a data transfer source address, an x size, an increment size, the number of increments, and a data storage destination address. The data transfer source address is an address in the upper level apparatus 10 and indicates the starting address of the image data of the page identified by the PBID. The x size is a data transfer size, which is a size of data transferred from the upper level apparatus 10 at one time from the image data of the page identified by the PBID. The x size includes the boundary adjustment size used for adjusting the data size in a predetermined unit (e.g., byte unit). The increment size indicates a data size of the data incremented from the beginning of the image data having been previously transferred from the upper level apparatus 10 of the page identified by the PBID. The number of increments indicates the number of times the increment is made. The data storage destination address indicates the starting address of a memory area in which the image data of the page identified by the PBID is stored in the printer engine 15.

The print information of the information common to the colors includes resolution, tone, a paper width, a paper conveying length, a print surface (front surface/back surface), a printing prohibited areas (on the upper, lower, left, and right sides), and image information. The resolution indicates printing resolution of the image data of the page identified by the PBID in each of the main-scanning direction and a sub-scanning direction. The tone indicates the number of bits per pixel of the image data of the page identified by the PBID. The paper width indicates the length of the printing paper in the width direction (the main-scanning direction) by the number of dots. The paper conveying length indicates the length of one page in the conveying direction (the sub-scanning direction) of the printing paper by the number of bits. The print surface indicates whether the image data of the page identified by the PBID is printed on the front surface or the back surface of the printing paper. The printing prohibited areas on the upper, the lower, the left, and the right sides indicate the areas on which printing is prohibited by the numbers of bits from the upper end (the front head in the paper conveying direction), the lower end (the rear end in the paper conveying direction), the left end (the left end in the paper width direction toward the paper conveying direction), and the right end (the right end in the paper width direction toward the paper conveying direction) of a page area, respectively. The image information includes an X direction effective size and a Y direction effective size. The X direction effective size indicates a size excluding the boundary adjustment area in the X direction (the paper width direction) by the number of dots. The boundary adjustment area is provided so as to adjust the data size in a predetermined unit when the data size of a piece of raster data includes fractions of the predetermined unit (e.g., byte unit) or less. The Y direction effective size indicates a size in the Y direction (paper conveying direction) by the number of dots. That is, the X direction effective size indicates the effective size printed by a piece of raster data while the Y direction effective size indicates the number of rasters (the number of lines) printed with the X direction effective size.

The information of each color in the print management table is described below. Each piece of the color information includes a color identifier in addition to the data transfer information and the print information. The color identifier identifies the printing color, for which the information is described, among colors C, M, Y, and K. The data transfer information of each of the color information includes information on the necessity of data transfer. The necessity of data transfer indicates whether the image data of the printing color identified by the color identifier needs to be transferred. For example, when blank paper is output, i.e., no printing is performed, the necessity of data transfer is set to "unnecessary" for all colors C, M, Y, and K. The necessity of data transfer is set to "unnecessary" for colors excluding the colors identified by the color identifiers. The print information of the information for each color includes necessity of printing. The necessity of printing indicates whether the image data of the print color identified by the color identifier needs to be printed. For example, when blank paper is output, i.e., no printing is performed, the necessity of printing is set to "unnecessary" for all colors C, M, Y, and K. The necessity of printing is set to "unnecessary" for colors excluding the colors identified by the color identifiers.

Operation

The operation of the printing system of the embodiment is described below. In the following description, the image data of color Y is transferred from the upper level apparatus 10 to the first data management unit 30a and the second data management unit 40a, the image data of color C is transferred from the upper level apparatus 10 to the first data management unit 30b and the second data management unit 40b, the image data of color M is transferred from the upper level apparatus 10 to the first data management unit 30c and the second data management unit 40c, and the image data of color K is transferred from the upper level apparatus 10 to the first data management unit 30d and the second data management unit 40d. The color transfer combination is not limited to this combination.

Figure 11A:
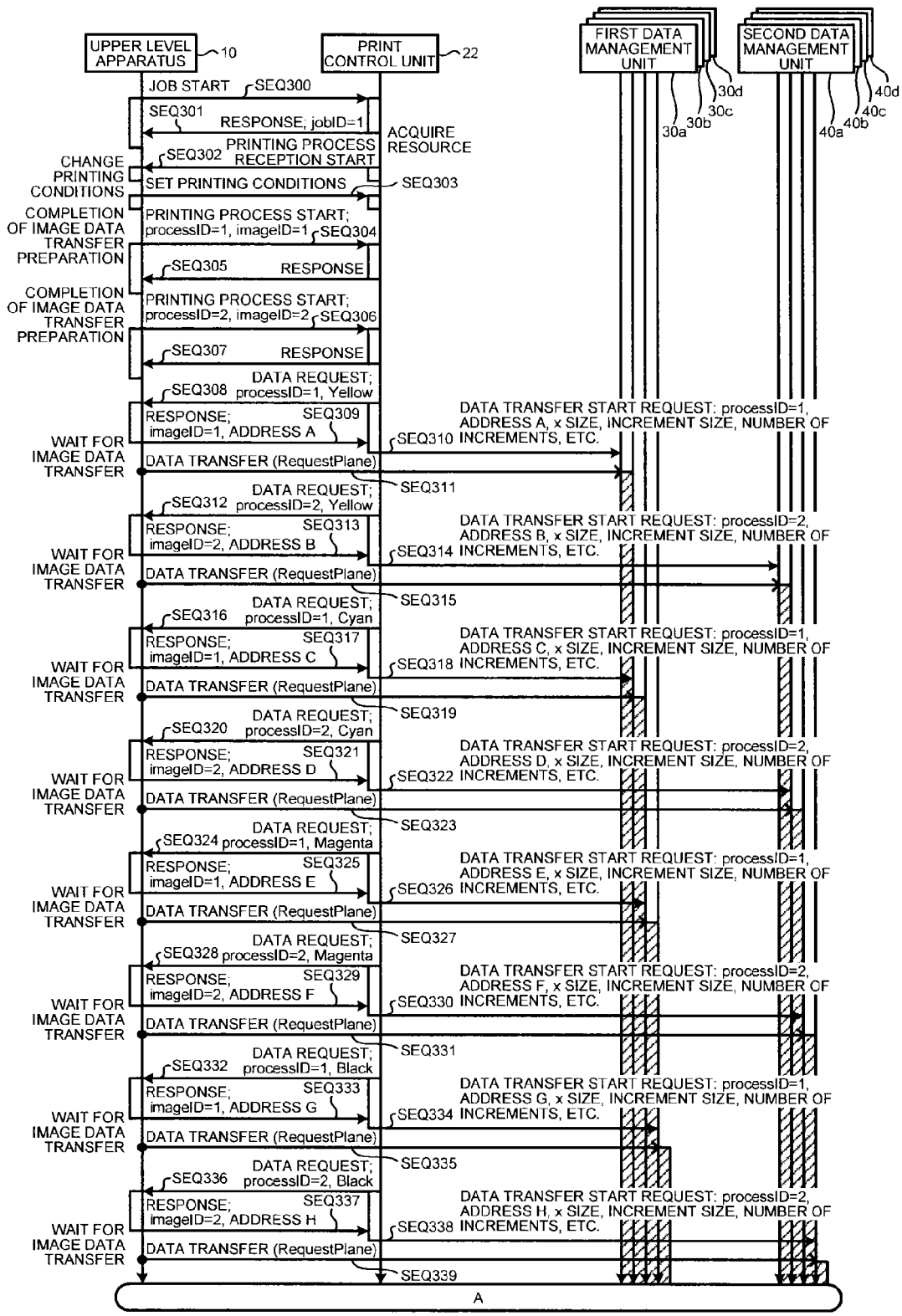
FIG. 11A is a sequence diagram illustrating an example of the continuous page printing performed in the two-up format by the printing system of the embodiment.
Figure 11B:
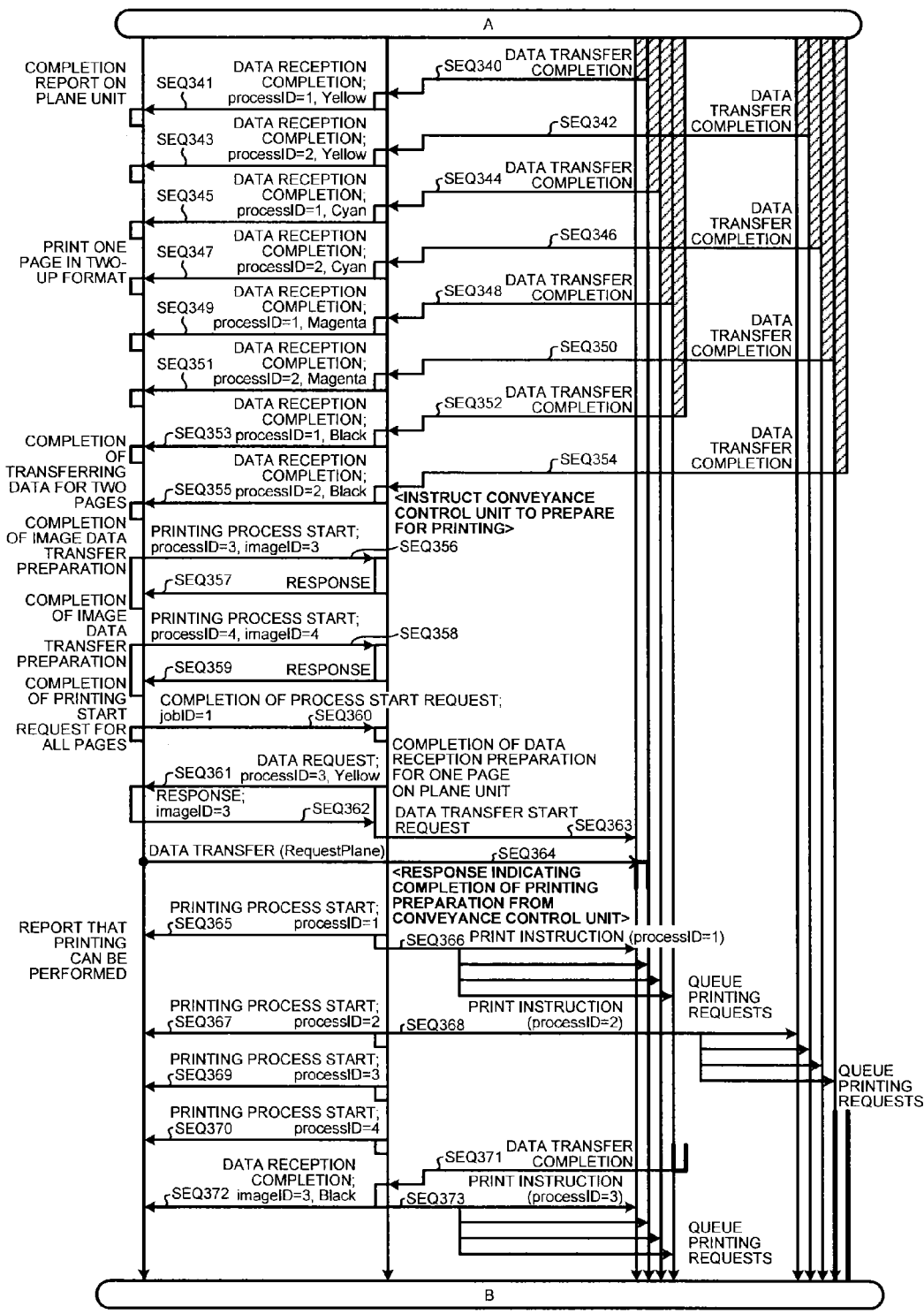
FIG. 11B is a successive sequence diagram illustrating the example of the continuous page printing performed in the two-up format by the printing system of the embodiment.
Figure 11C:
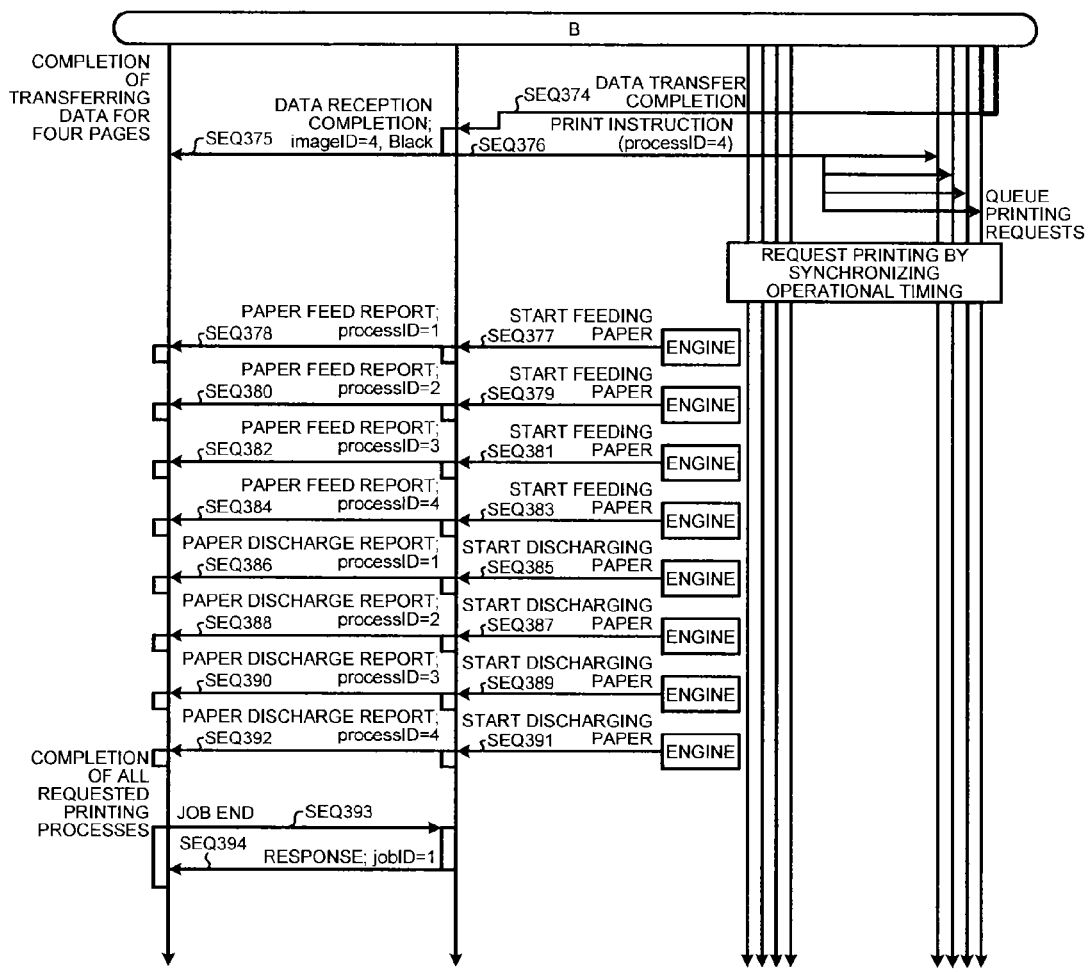
FIG. 11C is a successive sequence diagram illustrating the example of the continuous page printing performed in the two-up format by the printing system of the embodiment.

FIGS. 11A to 11C are sequence diagrams illustrating an example of processing of the continuous page printing in the two-up format by the printing system 1 of the embodiment. Specifically, the sequence diagrams illustrate a sequence of the continuous page printing from pages 1 to 4 by the first printing unit 29 and the second printing unit 39. In FIGS. 11A to 11C, processing transition between the sequence diagrams is indicated with boxes A and B.

As illustrated in FIG. 11A, the upper level apparatus 10 transmits the control information indicating the job start to the print control unit 22 through the control line 16 (SEQ300). The print control unit 22 transmits the control information indicating the jobID=1 to the upper level apparatus 10 through the control line 16 as a response to the control information indicating the job start transmitted from the upper level apparatus 10 (SEQ301). The print control unit 22 acquires a resource for executing the job before starting the job. The print control unit 22 transmits the control information indicating the printing process reception start to the upper level apparatus 10 through the control line 16 (SEQ302).

The upper level apparatus 10 transmits the control information indicating the printing conditions to the print control unit 22 through the control line 16 and sets the printing conditions (SEQ303). As described above with reference to FIG. 9, the control information indicating the printing conditions includes the printing type, the feeding and discharging information, the printing paper size (e.g., paper width), the image data size, the resolution and the tone, the color information, and the number of copies, for example. The print control unit 22 stores the printing conditions indicated by the received control information in a memory (not illustrated) thereof. The print control unit 22 determines that the printing format is the two-up format using the paper width and the resolution, for example, included in the printing conditions stored in the memory.

After completing preparation for transferring the image data for page 1, the upper level apparatus 10 transmits the control information indicating the printing process start on page 1 to the print control unit 22 through the control line 16 (SEQ304). The control information indicating the printing process start includes the process identification number processID=1 to identify this process and an image identification number imageID=1 to indicate the image to be printed on page 1. Upon receiving the control information indicating the printing process start on page 1, the print control unit 22 produces the print management table of the image data for each color for page 1 using the printing conditions stored in the memory. The sequence illustrated in FIGS. 11A to 11C is an example of the continuous page printing in the two-up format by the first printing unit 29 and the second printing unit 39. The first head 35 and the second head 45 are connected in series, the number of copies is "1", and the printing format is the two-up format in the printing conditions stored in the memory. The print control unit 22, therefore, determines that printing to be performed is the continuous page printing in the two-up format. The print control unit 22 produces one entry of the print management table of the image data for each page. For example, the set values for the print management table of the image data of each color for page 1 are: PBID=1, printing format=two-up format, copy count=1, number of copies=1 (an example of the setting for the continuous page printing), x size=size of the image data for page 1, increment size=0, and number of increments=1. At this point of time, the data transfer source address and the image output destination are not yet set in the print management tables of the image data of colors for page 1. The print control unit 22 transmits the control information indicating the printing process start to the upper level apparatus 10 as the response to the control information indicating the printing process start transmitted from the upper level apparatus 10 (SEQ305).

After completing preparation for transferring the image data for page 2, the upper level apparatus 10 transmits the control information indicating the printing process start on page 2 to the print control unit 22 through the control line 16 (SEQ306). The control information indicating the printing process start includes the process identification number processID=2 to identify this process, and the image identification number imageID=2 to indicate the image to be printed on page 2. Upon receiving the control information indicating the printing process start on page 2, the print control unit 22 produces the print management table of the image data for each color for page 2 using the printing conditions stored in the memory. For example, the print management table of the image data of each color for page 2 includes the values PBID=2, printing format=two-up format, copy count=1, number of copies=1, x size=size of the image data for page 2, increment size=0, and number of increments=1. At this point of time, the data transfer source address and the image output destination are not yet set in the print management tables of the image data of colors for page 2. The print control unit 22 transmits the control information indicating the printing process start to the upper level apparatus 10 as the response to the control information indicating the printing process start transmitted from the upper level apparatus 10 (SEQ307).

The print control unit 22 transmits the control information indicating the printing process request to the upper level apparatus 10 and requests the image data. The printing process request is sequentially made for each color of Y, C, M, and K in accordance with the color arrangement order in the printer engine 15. In the embodiment, as illustrated in FIG. 3, the first head 35a and the second head 45a for color Y, the first head 35b and the second head 45b for color C, the first head 35c and the second head 45c for color M, and the first head 35d and the second head 45d for color K are arranged along the conveying direction a of the printing paper 201 in this order.

The print control unit 22 transmits the control information indicating the printing process request that requests the image data of color Y for page 1 to the upper level apparatus 10 through the control line 16 (SEQ308). The control information indicating the printing process request includes the processID=1 and the color information Yellow designating color Y. The upper level apparatus 10 transmits the control information indicating the printing process request including the imageID=1 and address A, which is the data transfer source address of the image data of color Y for page 1, to the print control unit 22 as the response to the control information indicating the printing process request (SEQ309).

Upon receiving the control information indicating the printing process request including the imageID=1, the print control unit 22 sets the data transfer source address to address A and the image output destination to 1 in the print management table of the image data of color Y for page 1. In the embodiment, the print control unit 22 sets the image output destination to 1, because the current image output destination managed in the memory of the print control unit 22 is set to "the first printing unit 29". Thereafter, the print control unit 22 updates the current image output destination to "the second printing unit 39". The print control unit 22 causes the upper level apparatus 10 to transfer the image data of color Y for page 1 to the first data management unit 30a of the first printing unit 29, corresponding to color Y, in accordance with the print management table of the image data of color Y for page 1. Specifically, the print control unit 22 refers to the print management table of the image data of color Y for page 1, transmits that the processID=1, the data transfer source address=address A, the x size=the size of the image data for page 1, the increment size=0, and the number of increments=1 to the first data management unit 30a of the first printing unit 29, corresponding to color Y, and requests the first data management unit 30a to start the transfer of the image data of color Y for page 1 (SEQ310).

Upon receiving the request, the first data management unit 30a requests the image data of a plane of color Y for page 1 from the upper level apparatus 10 through the data line 17a (not illustrated). The first data management unit 30a requests the data corresponding to the size of the image data for page 1 from address A because the data transfer source address=address A, the x size=the size of the image data for page 1, the increment size=0, and the number of increments=1. In response to the request, the upper level apparatus 10 transfers the image data of color Y for page 1 to the first data management unit 30a at one time (SEQ311). For example, when the image data for page 1 is image data 212 illustrated in (b) of FIG. 12, the upper level apparatus 10 transfers image data 211 to the first data management unit 30a at one time. The transferred image data is stored in the first memory 31a of the first data management unit 30a. The first memory 31a manages the image data transferred from the upper level apparatus 10 for each processID.

The print control unit 22 transmits the control information indicating the printing process request that requests the image data of color Y for page 2 to the upper level apparatus 10 through the control line 16 (SEQ312). The control information indicating the printing process request includes the processID=2 and the color information Yellow. The upper level apparatus 10 transmits the control information indicating the printing process request including the imageID=2 and address B, which is the data transfer source address of the image data of color Y for page 2, to the print control unit 22 as the response to the control information indicating the printing process request (SEQ313).

Upon receiving the control information indicating the printing process request including the imageID=2, the print control unit 22 sets the data transfer source address to address B and the image output destination to 2 in the print management table of the image data of color Y for page 2. In the embodiment, the print control unit 22 sets the image output destination to 2 because the current image output destination managed in the memory of the print control unit 22 is set to "the second printing unit 39". Thereafter, the print control unit 22 updates the current image output destination to "the first printing unit 29". The print control unit 22 causes the upper level apparatus 10 to transfer the image data of color Y for page 2 to the second data management unit 40a of the second printing unit 39, corresponding to color Y, in accordance with the print management table of the image data of color Y for page 2. Specifically, the print control unit 22 refers to the print management table of the image data of color Y for page 2, transmits that the processID=2, the data transfer source address=address B, the x size=the size of the image data for page 2, the increment size=0, and the number of increments=1 to the second data management unit 40a of the second printing unit 39, corresponding to color Y, and requests the second data management unit 40a to start the transfer of the image data of color Y for page 2 (SEQ314).

Upon receiving the request, the second data management unit 40a requests the image data of a plane of color Y for page 2 from the upper level apparatus 10 through the data line 18a (not illustrated). The second data management unit 40a requests the data corresponding to the size of the image data for page 2 from address B because the data transfer source address=address B, the x size=the size of the image data for page 2, the increment size=0, and the number of increments=1. In response to the request, the upper level apparatus 10 transfers the image data of color Y for page 2 to the second data management unit 40a at one time (SEQ315). For example, when the image data for page 2 is image data 211 illustrated in (a) of FIG. 12, the upper level apparatus 10 transfers the image data 211 to the second data management unit 40a at one time. The transferred image data is stored in the second memory 41a of the second data management unit 40a. The second memory 41a also manages the image data transferred from the upper level apparatus 10 for each processID.

The processing is repeated for each color of C, M, and K in the same manner as the processing from SEQ308 to SEQ315. The image data of color C for page 1 is transferred to the first data management unit 30b from the upper level apparatus 10 through the data line 17b and stored in the first memory 31b (SEQ316 to SEQ319). Then, the image data of color C for page 2 is transferred to the second data management unit 40b from the upper level apparatus 10 through the data line 18b and stored in the second memory 41b (SEQ320 to SEQ323). Then, the image data of color M for page 1 is transferred to the first data management unit 30c from the upper level apparatus 10 through the data line 17c and stored in the first memory 31c (SEQ324 to SEQ327). Then, the image data of color M for page 2 is transferred to the second data management unit 40c from the upper level apparatus 10 through the data line 18c and stored in the second memory 41c (SEQ328 to SEQ331). Then, the image data of color K for page 1 is transferred to the first data management unit 30d from the upper level apparatus 10 through the data line 17d and stored in the first memory 31d (SEQ332 to SEQ335). Then, the image data of color K for page 2 is transferred to the second data management unit 40d from the upper level apparatus 10 through the data line 18d and stored in the second memory 41d (SEQ336 to SEQ339).

The description proceeds to FIG. 11B. Upon completion of the image data transfer for one plane, the print control unit 22 transmits the control information indicating the completion of receiving the image data to the upper level apparatus 10.

Upon completion of transferring the image data of the plane of color Y for page 1, the upper level apparatus 10 transmits the control information indicating the data transfer completion including the imageID=1 and the color information Yellow to the print control unit 22 (not illustrated). When the transfer of the image data from the upper level apparatus 10 through the data line 17a is completed, the first data management unit 30a transmits the notification of the completion to the print control unit 22 (SEQ340). In response to the notification, the print control unit 22 transmits the control information indicating the data reception completion including the imageID=1 and the color information Yellow to the upper level apparatus 10 (SEQ341).

Upon completion of the transferring the image data of the plane of color Y for page 2, the upper level apparatus 10 transmits the control information indicating the data transfer completion including the imageID=2 and the color information Yellow to the print control unit 22 (not illustrated). When the transfer of the image data from the upper level apparatus 10 through the data line 18a is completed, the second data management unit 40a transmits the notification of the completion to the print control unit 22 (SEQ342). In response to the notification, the print control unit 22 transmits the control information indicating the data reception completion including the imageID=2 and the color information Yellow to the upper level apparatus 10 (SEQ343).

Upon completion of transferring the corresponding image data, the processing is repeated for each color of C, M, and K in the same manner as the processing from SEQ340 to SEQ343 and the control information indicating the data reception completion of the corresponding image data is transmitted to the upper level apparatus 10 (SEQ344 to SEQ355).

After transmitting the control information indicating the data reception completion of the last image data (image data of color K) for page 2 to the upper level apparatus 10 at SEQ355, the print control unit 22 instructs the conveyance control unit 49 to prepare for printing. The conveyance control unit 49 starts conveying the printing paper to the print position in accordance with the instruction.

After completing the preparation for transferring the image data for page 3, the upper level apparatus 10 transmits the control information indicating the printing process start on page 3 to the print control unit 22 through the control line 16 (SEQ356). The control information indicating the printing process start includes the processID=3, which is the process identification number to identify this process, and the imageID=3, which is the image identification number to indicate the image to be printed on page 3. Upon receiving the control information indicating the printing process start on page 3, the print control unit 22 produces the print management table of the image data of each color for page 3 using the printing conditions stored in the memory. For example, the print management table of the image data of each color for page 3 includes the values: PBID=3, printing format=two-up format, copy count=1, number of copies=1, x size=size of the image data for page 3, increment size=0, and number of increments=1. At this point of time, the data transfer source address and the image output destination are not yet set in the print management tables of the image data of colors for page 3. The print control unit 22 transmits the control information indicating the printing process start to the upper level apparatus 10 as the response to the control information indicating the printing process start transmitted from the upper level apparatus 10 (SEQ357).

After completing the preparation for transferring the image data for page 4, the upper level apparatus 10 transmits the control information indicating the printing process start on page 4 to the print control unit 22 through the control line 16 (SEQ358). The control information indicating the printing process start includes the processID=4, which is the process identification number to identify this process, and the imageID=4, which is the image identification number to indicate the image to be printed on page 4. Upon receiving the control information indicating the printing process start on page 4, the print control unit 22 produces the print management table of the image data of each color for page 4 using the printing conditions stored in the memory. For example, the print management table of the image data of each color for page 4 includes the following set values: PBID=4, printing format=two-up format, copy count=1, number of copies=1, x size=size of the image data for page 4, increment size=0, and number of increments=1. At this point of time, the data transfer source address and the image output destination are not yet set in the print management tables of the image data of colors for page 4. The print control unit 22 transmits the control information indicating the printing process start to the upper level apparatus 10 as the response to the control information indicating the printing process start transmitted from the upper level apparatus 10 (SEQ359).

When printing a total of four pages, the printing process start request for performing printing is completed by the processing at SEQ 358 and SEQ 359. Upon receiving the response to the printing process start request for page 4 at SEQ359, the upper level apparatus 10 transmits the control information indicating the process start request completion that designates the jobID=1 to the print control unit 22 (SEQ360).

The print control unit 22 transmits the control information indicating the printing process request that requests the image data of color Y for page 3 to the upper level apparatus 10 through the control line 16 (SEQ361). The control information indicating the printing process request includes the processID=3 and the color information Yellow designating color Y. The upper level apparatus 10 transmits the control information indicating the printing process request including the imageID=3 and the data transfer source address of the image data of color Y for page 3 to the print control unit 22 as the response to the control information indicating the printing process request (SEQ362).

Upon receiving the control information indicating the printing process request including the imageID=3, the print control unit 22 sets the data transfer source address and sets the image output destination to 1 in the print management table of the image data of color Y for page 3. In the embodiment, the print control unit 22 sets the image output destination to 1 because the current image output destination managed in the memory of the print control unit 22 is set to "the first printing unit 29". Thereafter, the print control unit 22 updates the current image output destination to "the second printing unit 39". The print control unit 22 causes the upper level apparatus 10 to transfer the image data of color Y for page 3 to the first data management unit 30a of the first printing unit 29, corresponding to color Y, in accordance with the print management table of the image data of color Y for page 3. Specifically, the print control unit 22 refers to the print management table of the image data of color Y for page 3 and requests the first data management unit 30a of the first printing unit 29, corresponding to color Y, to start the transfer of the image data of color Y for page 3 (SEQ363).

Upon receiving the request, the first data management unit 30a requests the image data of the plane of color Y for page 3 from the upper level apparatus 10 through the data line 17a (not illustrated). In response to the request, the upper level apparatus 10 transfers the image data of color Y for page 3 to the first data management unit 30a at one time (SEQ364). The transferred image data is stored in the first memory 31a of the first data management unit 30a. The first memory 31a manages the image data of color Y for page 1 and the image data of color Y for page 3.

The processing is repeated on the image data of color Y for page 4, the image data of color C for page 3, the image data of color C for page 4, the image data of color M for page 3, the image data of color M for page 4, the image data of color K for page 3, and the image data of color K for page 4 in the same manner as the processing from SEQ 361 to SEQ 364 (not illustrated).

The upper level apparatus 10 transmits the control information indicating the data transfer completion to the print control unit 22 for each completion of transferring the image data of one plane in the same manner as described above. In response to the control information, the print control unit 22 transmits the control information indicating the completion of receiving the image data to the upper level apparatus 10.

In the example in FIG. 11B, when the transfer of the image data of the plane of color K for page 3 from the upper level apparatus 10 through the data line 17d is completed, the first data management unit 30d transmits the notification of the completion to the print control unit 22 (SEQ371). The print control unit 22 transmits the control information indicating the data reception completion including the imageID=3 and the color information Black to the upper level apparatus 10 in response to the notification and the control information indicating the data transfer completion of the image data of the plane of color K for page 3 transmitted from the upper level apparatus 10 (not illustrated) (SEQ372).

Upon completion of transferring the corresponding image data, the processing is repeated for each color of Y, C, and M for page 3 in the same manner as the processing at SEQ371 and SEQ372 and the control information indicating the data reception completion of the corresponding image data is transmitted to the upper level apparatus 10 (not illustrated).

The description proceeds to FIG. 11C, when the transfer of the image data of the plane of color K for page 4 from the upper level apparatus 10 through the data line 18d is completed, the second data management unit 40d transmits the notification of the completion to the print control unit 22 (SEQ374). The print control unit 22 transmits the control information indicating the data reception completion including the imageID=4 and the color information Black to the upper level apparatus 10 in response to the notification and the control information indicating the data transfer completion of the image data of the plane of color K for page 4 transmitted from the upper level apparatus 10 (not illustrated) (SEQ375).

Upon completion of transferring the corresponding image data, the processing is repeated for each color of Y, C, and M for page 4 in the same manner as the processing at SEQ374 and SEQ375 and the control information indicating the data reception completion of the corresponding image data is transmitted to the upper level apparatus 10 (not illustrated).

In the example of FIG. 11B, the print control unit 22 instructs the conveyance control unit 49 to make the preparation for printing after SEQ355. In response to the instruction, the conveyance control unit 49 notifies the print control unit 22 of the completion of the preparation for printing after SEQ364. Upon receiving the notification, the print control unit 22 transmits the control information indicating the printing process start including the processID=1, the control information indicating the printing process start including the processID=2, the control information indicating the printing process start including the processID=3, and the control information indicating the printing process start including the processID=4 to the upper level apparatus 10 (SEQ365, SEQ367, SEQ369, and SEQ370). In this way, the upper level apparatus 10 is notified that pages 1 to 4 can be printed.

In the example of FIG. 11B, the transfer of the image data of each color for page 1 to the first data management units 30a to 30d is completed at SEQ365 and the transfer of the image data of each color for page 2 to the second data management units 40a to 40d is completed at SEQ367. Therefore, the print control unit 22 notifies the first data management units 30a to 30d of the print instruction including the processID=1 immediately after SEQ365 (SEQ366) while the print control unit 22 notifies the second data management units 40a to 40d of the print instruction including the processID=2 immediately after SEQ367 (SEQ368). The print instructions notified to the first data management units 30a to 30d are stored and retained in the first memories 31a to 31d, respectively, while the print instructions notified to the second data management units 40a to 40d are stored and retained in the second memories 41a to 41d, respectively, for example. The actual printing according to the print instructions is performed by synchronizing the operational timing of printing a following page, for example.

Upon completion of transferring the image data of each color for page 3 to the first data management units 30a to 30d (refer to SEQ371), the print control unit 22 notifies the first data management units 30a to 30d of the print instruction including the processID=3 (SEQ373). Upon completion of transferring the image data of each color for page 4 to the second data management units 40a to 40d (refer to SEQ374), the print control unit 22 notifies the second data management units 40a to 40d of the print instructions including the processID=4 (SEQ376).

Then, the printer engine 15 prints pages 1 and 2 in accordance with the print instructions at SEQ366 and SEQ368 and starts the feeding of the printing paper. The printer engine 15 notifies the print control unit 22 of the start of feeding the paper for page 1 (SEQ377) and also notifies the print control unit 22 of the start of feeding the paper for page 2 (SEQ379). Upon receiving the notifications, the print control unit 22 transmits the control information indicating the start of feeding the paper for page 1 and including the processID=1 to the upper level apparatus 10 (SEQ378) and also transmits the control information indicating the start of feeding the paper for page 2 and including the processID=2 to the upper level apparatus 10 (SEQ380). Upon starting the feeding of the paper, the printer engine 15 reads out the image data of each color of Y, C, M, and K for page 1 from the respective first memories 31a to 31d and the image data of each color of Y, C, M, and K for page 2 from the respective second memories 41a to 41d by synchronizing the operation of the first data management units 30a to 30d and the second data management units 40a to 40d. Then, each plane for pages 1 and 2 is sequentially printed on the printing paper.

The processing is repeated for pages 3 and 4 in the same manner as the processing from SEQ377 to SEQ380 and each plane for pages 3 and 4 is sequentially printed on the printing paper (SEQ381 to SEQ384).

When printing of each color for pages 1 and 2 is completed and the printing paper corresponding to pages 1 and 2 is discharged, the printer engine 15 notifies the print control unit 22 of the discharge (SEQ385 and SEQ387). Upon receiving the notifications, the print control unit 22 transmits the control information indicating the discharge of the paper corresponding to page 1 and including the processID=1 to the upper level apparatus 10 (SEQ386) and also transmits the control information indicating the discharge of the paper corresponding to page 2 and including the processID=2 to the upper level apparatus 10 (SEQ388).

The processing is repeated for pages 3 and 4 in the same manner as the processing from SEQ385 to SEQ388 and the control information indicating the discharge of the printing paper corresponding to pages 3 and 4 is transmitted to the upper level apparatus 10 (SEQ389 to SEQ392).

When receiving a discharge report indicating that the paper corresponding to the number of pages to be printed set by the setting of the printing conditions at SEQ303 is discharged, for example, the upper level apparatus 10 transmits the control information indicating the job end including the jobID=1 to the print control unit 22 as the completion of the printing of the job start that was notified at SEQ300 (SEQ393). Upon receiving the control information, the print control unit 22 transmits the control information including the jobID=1 to the upper level apparatus 10 as the response to the control information (SEQ394). In this manner, a series of printing processes is completed.

Figure 13:
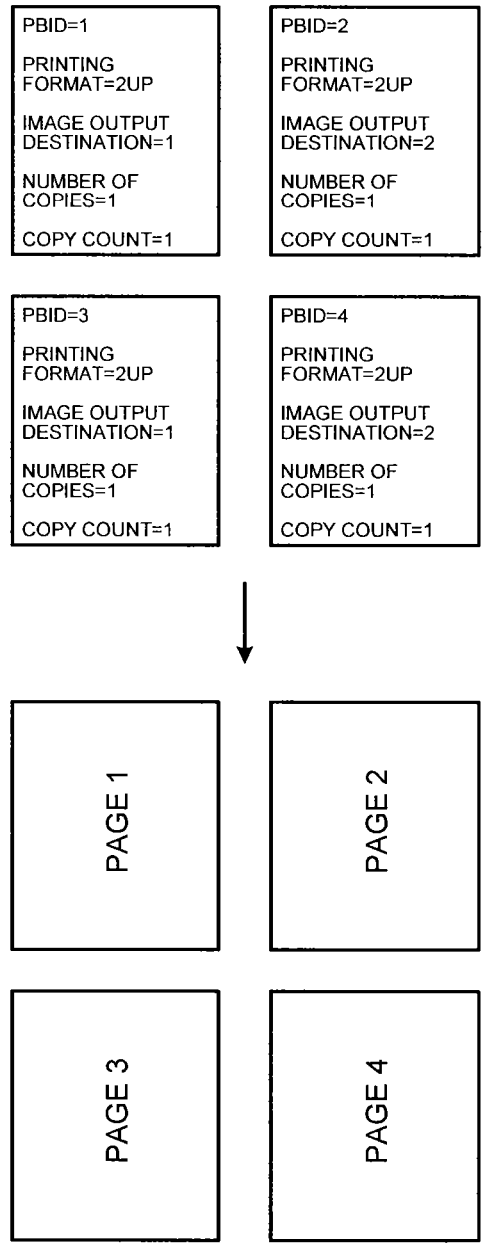
FIG. 13 is an explanatory view illustrating a relationship between the print management tables produced in the sequence illustrated in FIGS. 11A to 11C and pages to be printed.

FIG. 13 illustrates a relationship between the print management tables produced in the sequence illustrated in FIGS. 11A to 11C and the pages to be printed.

Figure 14A:
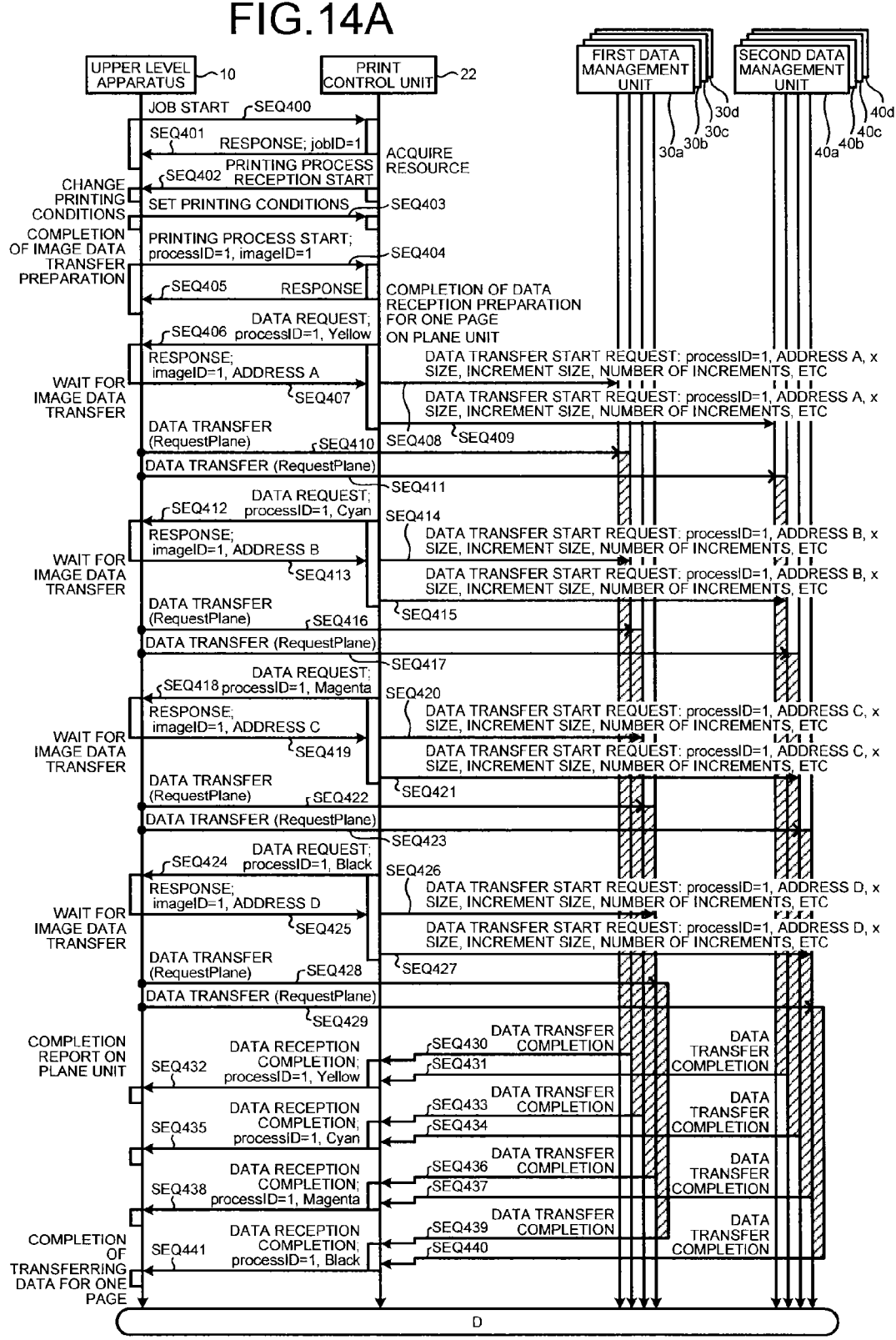
FIG. 14A is a sequence diagram illustrating an example of the copy page printing performed in the two-up format by the printing system of the embodiment.
Figure 14B:
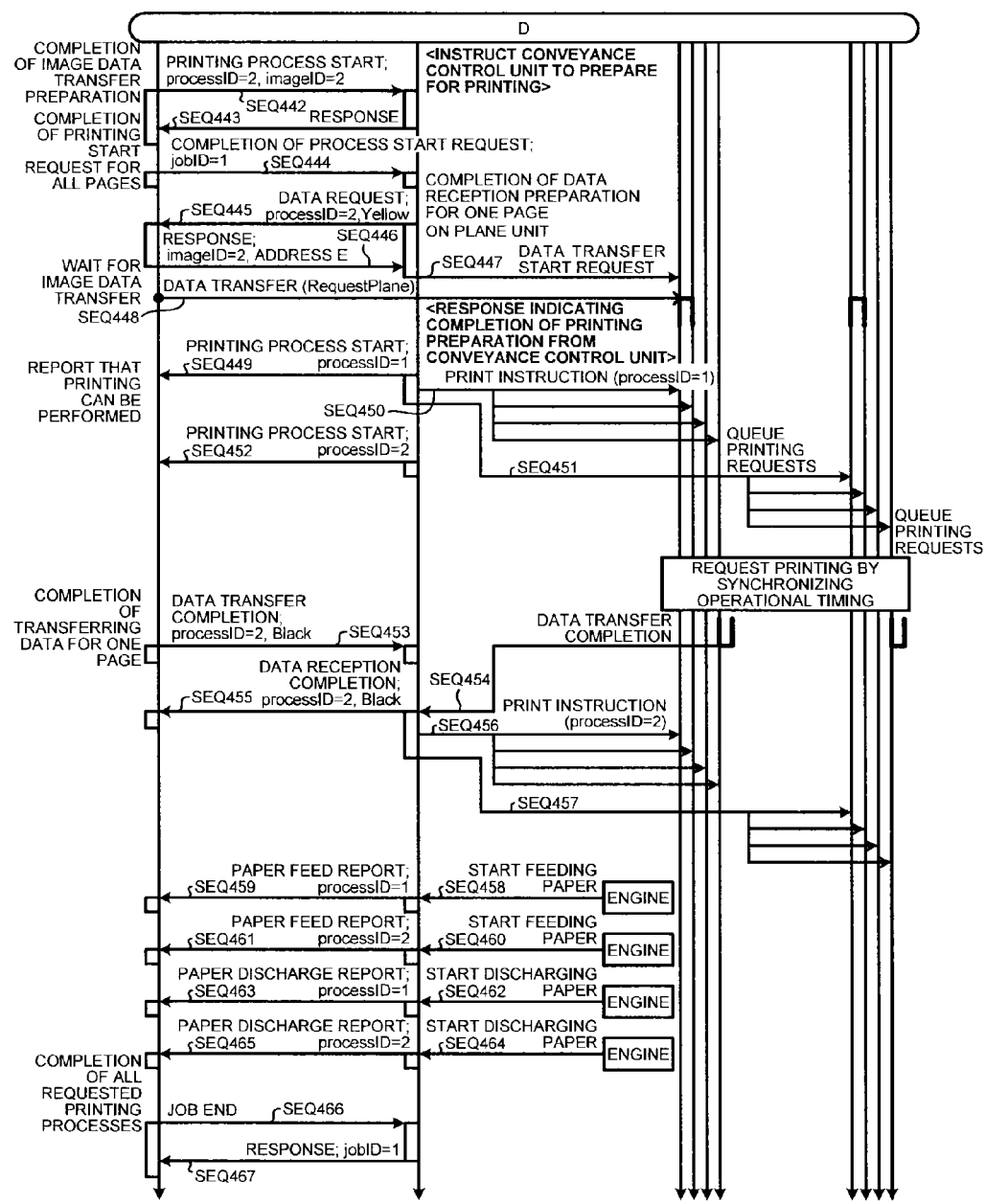
FIG. 14B is a successive sequence diagram illustrating the example of the copy page printing performed in the two-up format by the printing system of the embodiment.

FIGS. 14A and 14B are sequence diagrams illustrating an example of processing of copy page printing in the two-up format by the printing system 1 of the embodiment. Specifically, the sequence diagrams illustrate a sequence of the copy page printing in which pages 1 and 2 are printed in two copies each by the first printing unit 29 and the second printing unit 39. In FIGS. 14A and 14B, processing transition between the sequence diagrams is indicated with box D.

The processing from SEQ400 to SEQ402 is the same as that from SEQ300 to SEQ302 illustrated in FIG. 11A.

Then, the upper level apparatus 10 transmits the control information indicating the printing conditions to the print control unit 22 through the control line 16 and sets the printing conditions (SEQ403). As described above with reference to FIG. 9, the control information indicating the printing conditions includes the printing type, the feeding and discharging information, the printing paper size (e.g., paper width), the image data size, the resolution and the tone, the color information, and the number of copies, for example. The print control unit 22 stores the printing conditions indicated by the received control information in the memory (not illustrated) thereof. The print control unit 22 determines that the printing format is the two-up format using the paper width and the resolution, for example, included in the printing conditions stored in the memory.

After completing the preparation for transferring the image data for page 1, the upper level apparatus 10 transmits the control information indicating the printing process start on page 1 to the print control unit 22 through the control line 16 (SEQ404). The control information indicating the printing process start includes the processID=1, which is the process identification number to identify this process, and the imageID=1, which is the image identification number to indicate the image to be printed on page 1. Upon receiving the control information indicating the printing process start on page 1, the print control unit 22 produces the print management table of the image data for each color for page 1 using the printing conditions stored in the memory. The sequence illustrated in FIGS. 14A and 14B is the example of the copy page printing in two-up format by the first printing unit 29 and the second printing unit 39. The first head 35 and the second head 45 are connected in series, the number of copies is "2", and the printing format is the two-up format in the printing conditions stored in the memory. The print control unit 22, therefore, determines that printing to be performed is the continuous page printing in the two-up format. The print control unit 22 produces two entries of the print management table of the image data for each page. For example, the first entry of the print management table of the image data of each color for page 1 includes the following set values: PBID=1, printing format=two-up format, copy count=1, number of copies=2 (an example of the setting for the copy page printing), x size=size of the image data for page 1, increment size=0, and number of increments=1. For example, the print management table of the second entry of the image data of each color for page 1 includes the following set values: PBID=1, printing format=two-up format, copy count=2, number of copies=2, x size=size of the image data for page 1, increment size=0, and number of increments=1. At this point of time, the data transfer source address and the image output destination are not yet set in any of the print management tables of the image data of colors for page 1. The print control unit 22 transmits the control information indicating the printing process start to the upper level apparatus 10 as the response to the control information indicating the printing process start transmitted from the upper level apparatus 10 (SEQ405).

The print control unit 22 transmits the control information indicating the printing process request to the upper level apparatus 10 and requests the image data.

The print control unit 22 transmits the control information indicating the printing process request that requests the image data of color Y for page 1 to the upper level apparatus 10 through the control line 16 (SEQ406). The control information indicating the printing process request includes the processID=1 and the color information Yellow designating color Y. The upper level apparatus 10 transmits the control information indicating the printing process request including the imageID=1 and address A, which is the data transfer source address of the image data of color Y for page 1, to the print control unit 22 as the response to the control information indicating the printing process request (SEQ407).

Upon receiving the control information indicating the printing process request including the imageID=1, the print control unit 22 sets the data transfer source address to address A and the image output destination is 1 in the first entry of the print management table of the image data of color Y for page 1. In the embodiment, the print control unit 22 sets the image output destination to 1 because the current image output destination managed in the memory of the print control unit 22 is set to "the first printing unit 29". Thereafter, the print control unit 22 updates the current image output destination to "the second printing unit 39". The print control unit 22 causes the upper level apparatus 10 to transfer the image data of color Y for page 1 to the first data management unit 30a of the first printing unit 29, corresponding to color Y, in accordance with the first entry of the print management table of the image data of color Y for page 1. Specifically, the print control unit 22 refers to the first entry of the print management table of the image data of color Y for page 1, transmits that the processID=1, the data transfer source address=address A, the x size=the size of the image data for page 1, the increment size=0, and the number of increments=1 to the first data management unit 30a of the first printing unit 29, corresponding to color Y, and requests the first data management unit 30a to start the transfer of the image data of color Y for page 1 (SEQ408).

Likewise, the print control unit 22 sets the data transfer source address to address A and the image output destination to 2 in the second entry of the print management table of the image data of color Y for page 1. In the embodiment, the print control unit 22 sets the image output destination to 2 because the current image output destination managed in the memory of the print control unit 22 is set to "the second printing unit 39". Thereafter, the print control unit 22 updates the current image output destination to "the first printing unit 29". The print control unit 22 causes the upper level apparatus 10 to transfer the image data of color Y for page 1 to the second data management unit 40a of the second printing unit 39, corresponding to color Y, in accordance with the second entry of the print management table of the image data of color Y for page 1. Specifically, the print control unit 22 refers to the second entry of the print management table of the image data of color Y for page 1, transmits that the processID=1, the data transfer source address=address A, the x size=the size of the image data for page 1, the increment size=0, and the number of increments=1 to the second data management unit 40a of the second printing unit 39, corresponding to color Y, and requests the second data management unit 40a to start the transfer of the image data of color Y for page 1 (SEQ409).

Upon receiving the request, the first data management unit 30a requests the image data of the plane of color Y for page 1 from the upper level apparatus 10 through the data line 17a (not illustrated). The first data management unit 30a requests the data corresponding to the size of the image data for page 1 from address A because the data transfer source address=address A, the x size=the size of the image data for page 1, the increment size=0, and the number of increments=1. In response to the request, the upper level apparatus 10 transfers the image data of color Y for page 1 to the first data management unit 30a at one time (SEQ410). The transferred image data is stored in the first memory 31a of the first data management unit 30a. The first memory 31a manages the image data transferred from the upper level apparatus 10 for each processID.

Likewise, upon receiving the request, the second data management unit 40a requests the image data of the plane of color Y for page 1 from the upper level apparatus 10 through the data line 18a (not illustrated). The second data management unit 40a requests the data corresponding to the size of the image data for page 1 from address A because the data transfer source address=address A, the x size=the size of the image data for page 1, the increment size=0, and the number of increments=1. In response to the request, the upper level apparatus 10 transfers the image data of color Y for page 1 to the second data management unit 40a at one time (SEQ411). The transferred image data is stored in the second memory 41a of the second data management unit 40a. The second memory 41a also manages the image data transferred from the upper level apparatus 10 for each processID.

The processing is repeated for each color of C, M, and K in the same manner as the processing from SEQ406 to SEQ411. The image data of color C for page 1 is transferred to the first data management unit 30b from the upper level apparatus 10 through the data line 17b and stored in the first memory 31b and is also transferred to the second data management unit 40b from the upper level apparatus 10 through the data line 18b and stored in the second memory 41b (SEQ412 to SEQ417). Then, the image data of color M for page 1 is transferred to the first data management unit 30a from the upper level apparatus 10 through the data line 17c and stored in the first memory 31*c* and is also transferred to the second data management unit 40*c* from the upper level apparatus 10 through the data line 18*c* and stored in the second memory 41*c* (SEQ418 to SEQ423). Then, the image data of color K for page 1 is transferred to the first data management unit 30*d* from the upper level apparatus 10 through the data line 17*d* and stored in the first memory 31*d* and is also transferred to the second data management unit 40*d* from the upper level apparatus 10 through the data line 18*d* and stored in the second memory 41*d* (SEQ424 to SEQ429).

Upon completion of the image data transfer for one plane, the print control unit 22 transmits the control information indicating the completion of receiving the image data to the upper level apparatus 10.

Upon completion of transferring the image data of the plane of color Y for page 1, the upper level apparatus 10 transmits the control information indicating the data transfer completion including the imageID=1 and the color information Yellow to the print control unit 22 (not illustrated). Upon completion of transferring the image data from the upper level apparatus 10 through the data line 17*a*, the first data management unit 30*a* transmits the notification of the completion to the print control unit 22 (SEQ430). Upon completion of transferring the image data from the upper level apparatus 10 through the data line 18*a*, the second data management unit 40*a* transmits the notification of the completion to the print control unit 22 (SEQ431). In response to the notifications, the print control unit 22 transmits the control information indicating the data reception completion including the imageID=1 and the color information Yellow to the upper level apparatus 10 (SEQ432).

Upon completion of transferring the corresponding image data, the processing is repeated for each color of C, M, and K in the same manner as the processing from SEQ430 to SEQ432 and the control information indicating the data reception completion of the corresponding image data is transmitted to the upper level apparatus 10 (SEQ433 to SEQ441).

The description proceeds to the sequence diagram in FIG. 14B, after transmitting the control information indicating the data reception completion of the last image data (image data of color K) for page 1 to the upper level apparatus 10 at SEQ441, the print control unit 22 instructs the conveyance control unit 49 to prepare for printing. The conveyance control unit 49 starts conveying the printing paper to the print position in accordance with the instruction.

After completing the preparation for transferring the image data for page 2, the upper level apparatus 10 transmits the control information indicating the printing process start on page 2 to the print control unit 22 through the control line 16 (SEQ442). The control information indicating the printing process start includes the processID=2, which is the process identification number to identify this process, and the imageID=2, which is the image identification number to indicate the image to be printed on page 2. Upon receiving the control information indicating the printing process start on page 2, the print control unit 22 produces the print management table of the image data for each color for page 2 using the printing conditions stored in the memory. For example, the first entry of the print management table of the image data of each color for page 2 includes the following set values: PBID=2, printing format=two-up format, copy count=1, number of copies=2, x size=size of the image data for page 2, increment size=0, and number of increments=1. For example, the second entry of the print management table of the image data of each color for page 2 includes the following set values: PBID=2, printing format=two-up format, copy count=2, number of copies=2, x size=size of the image data for page 2, increment size=0, and number of increments=1. At this point of time, the data transfer source address and the image output destination are not yet set in any print management tables of the image data of colors for page 2. The print control unit 22 transmits the control information indicating the printing process start to the upper level apparatus 10 as the response to the control information indicating the printing process start transmitted from the upper level apparatus 10 (SEQ443).

When printing a total of two pages, the printing process start request for performing printing is completed by the processing at SEQ 442 and SEQ 443. Upon receiving the response to the printing process start request for page 2 at SEQ443, the upper level apparatus 10 transmits the control information indicating the process start request completion that designates the jobID=1 to the print control unit 22 (SEQ444).

The print control unit 22 transmits the control information indicating the printing process request that requests the image data of color Y for page 2 to the upper level apparatus 10 through the control line 16 (SEQ445). The control information indicating the printing process request includes the processID=2 and the color information Yellow designating color Y. The upper level apparatus 10 transmits the control information indicating the printing process request including the imageID=2 and address E, which is the data transfer source address of the image data of color Y for page 2, to the print control unit 22 as the response to the control information indicating the printing process request (SEQ446).

Upon receiving the control information indicating the printing process request including the imageID=2, the print control unit 22 sets the data transfer source address to address E and the image output destination to 1 in the first entry of the print management table of the image data of color Y for page 2. In the embodiment, the print control unit 22 sets the image output destination to 1 because the current image output destination managed in the memory of the print control unit 22 is set to "the first printing unit 29". Thereafter, the print control unit 22 updates the current image output destination to "the second printing unit 39". The print control unit 22 causes the upper level apparatus 10 to transfer the image data of color Y for page 2 to the first data management unit 30*a* of the first printing unit 29, corresponding to color Y, in accordance with the first entry of the print management table of the image data of color Y for page 2. Specifically, the print control unit 22 refers to the first entry of the print management table of the image data of color Y for page 2, transmits that the processID=2, the data transfer source address=address E, the x size=the size of the image data for page 2, the increment size=0, and the number of increments=1 to the first data management unit 30*a* of the first printing unit 29, corresponding to color Y, and requests the first data management unit 30*a* to start the transfer of the image data of color Y for page 2 (SEQ447).

Likewise, the print control unit 22 sets the data transfer source address to address E and the image output destination to 2 in the second entry of the print management table of the image data of color Y for page 2. In the embodiment, the print control unit 22 sets the image output destination to 2 because the current image output destination managed in the memory of the print control unit 22 is set to "the second printing unit 39". Thereafter, the print control unit 22 updates the current image output destination to "the first printing unit 29". The print control unit 22 causes the upper level apparatus 10 to transfer the image data of color Y for page 2 to the second data management unit 40*a* of the second printing unit 39, corresponding to color Y, in accordance with the second entry of the print management table of the image data of color Y for page 2. Specifically, the print control unit 22 refers to the second entry of the print management table of the image data of color Y for page 2, transmits that the processID=2, the data transfer source address=address E, the x size=the size of the image data for page 2, the increment size=0, and the number increments=1 to the second data management unit 40a of the second printing unit 39, corresponding to color Y, and requests the second data management unit 40a to start the transfer of the image data of color Y for page 2 (not illustrated).

Upon receiving the request, the first data management unit 30a requests the image data of the plane of color Y for page 2 from the upper level apparatus 10 through the data line 17a (not illustrated). The first data management unit 30a requests the data corresponding to the size of the image data for page 2 from address E, because the data transfer source address=address E, the x size=the size of the image data for page 2, the increment size=0, and the number of increments=1. In response to the request, the upper level apparatus 10 transfers the image data of color Y for page 2 to the first data management unit 30a at one time (SEQ448). The transferred image data is stored in the first memory 31a of the first data management unit 30a. The first memory 31a manages the image data of color Y for page 1 and the image data of color Y for page 2.

Likewise, upon receiving the request, the second data management unit 40a requests the image data of the plane of color Y for page 2 from the upper level apparatus 10 through the data line 18a (not illustrated). The second data management unit 40a requests the data corresponding to the size of the image data for page 2 from address E, because the data transfer source address=address E, the x size=the size of the image data for page 2, the increment size=0, and the number of increments=1. In response to the request, the upper level apparatus 10 transfers the image data of color Y for page 2 to the second data management unit 40a at one time (not illustrated). The transferred image data is stored in the second memory 41a of the second data management unit 40a. The second memory 41a manages the image data of color Y for page 1 and the image data of color Y for page 2.

The processing is repeated on the image data of color C for page 2, on the image data of color M for page 2, and on the image data of color K for page 2 in the same manner as the processing from SEQ445 to SEQ448 (not illustrated).

The upper level apparatus 10 transmits the control information indicating the data transfer completion to the print control unit 22 for each completion of transferring the image data of one plane in the same manner as described above. In response to the control information, the print control unit 22 transmits the control information indicating the completion of receiving the image data to the upper level apparatus 10.

In the example in FIG. 14B, when the transfer of the image data of the plane of color K for page 2 from the upper level apparatus 10 through the data line 17d is completed, the first data management unit 30d transmits the notification of the completion to the print control unit 22 (SEQ454). When the transfer of the image data of the plane of color K for page 2 from the upper level apparatus 10 through the data line 17d is completed, the second data management unit 40d transmits the notification of the completion to the print control unit 22 (not illustrated). The print control unit 22 transmits the control information indicating the data reception completion including the imageID=2 and the color information Black to the upper level apparatus 10 in response to the notifications and the control information indicating the data transfer completion of the image data of the plane of color K for page 2 transmitted from the upper level apparatus 10 (not illustrated) (SEQ455).

Upon completion of transferring the corresponding image data, the processing is repeated for each color of Y, C, and M for page 2 in the same manner as the processing at SEQ454 and SEQ455 and the control information indicating the data reception completion of the corresponding image data is transmitted to the upper level apparatus 10 (not illustrated).

In the example of FIG. 14B, the print control unit 22 instructs the conveyance control unit 49 to prepare for printing after SEQ441. In response to the instruction, the conveyance control unit 49 notifies the print control unit 22 of the completion of the preparation for printing after SEQ448. Upon receiving the notification, the print control unit 22 transmits the control information indicating the printing process start including the processID=1 and the control information indicating the printing process start including the processID=2 to the upper level apparatus (SEQ449 and SEQ452). In this way, the upper level apparatus 10 is notified that pages 1 and 2 can be printed.

In the example of FIG. 14B, the transfer of the image data of each color for page 1 to the first data management units 30a to 30d and the second data management units 40a to 40d is completed at SEQ449. Therefore, the print control unit 22 notifies the first data management units 30a to 30d and the second data management units 40a to 40d of the print instructions including the processID=1 immediately after SEQ449 (SEQ450 and SEQ451).

Upon completion of transferring the image data of each color for page 2 to the first data management units 30a to 30d and the second data management units 40a to 40d (refer to SEQ455), the print control unit 22 notifies the first data management units 30a to 30d and the second data management units 40a to 40d of the print instructions including the processID=2 (SEQ456 and SEQ457).

Then, the printer engine 15 prints page 1 in accordance with the print instructions at SEQ450 and SEQ451 and starts the feeding of the printing paper. The printer engine 15 notifies the print control unit 22 of the start of feeding the paper for page 1 (SEQ458). Upon receiving the notification, the print control unit 22 transmits the control information indicating the start of feeding the paper for page 1 and including the processID=1 to the upper level apparatus 10 (SEQ459). Upon starting of feeding the paper, the printer engine 15 reads out the image data of each color of Y, C, M, and K for page 1 from the respective first memories 31a to 31d and from the respective second memories 41a to 41d by synchronizing the operation of the first data management units 30a to 30d and the second data management units 40a to 40d. Then, each plane for page 1 is sequentially printed on the printing paper.

The processing is repeated for page 2 in the same manner as the processing at SEQ458 and SEQ459 and each plane for page 2 is sequentially printed on the printing paper (SEQ460 and SEQ461).

When printing of each color for page 1 is completed and the printing paper corresponding to page 1 is discharged, the printer engine 15 notifies the print control unit 22 of the discharge (SEQ462). Upon receiving the notification, the print control unit 22 transmits the control information indicating the discharge of the paper corresponding to page 1 and including the processID=1 to the upper level apparatus 10 (SEQ463).

The processing is repeated for page 2 in the same manner as the processing at SEQ462 and SEQ463 and the control information indicating the discharge of the printing paper corresponding to page 2 is transmitted to the upper level apparatus 10 (SEQ464 and SEQ465).

The processing at SEQ 466 and SEQ 467 is the same as the processing at SEQ393 and SEQ394 illustrated in FIG. 11C.

Figure 15:
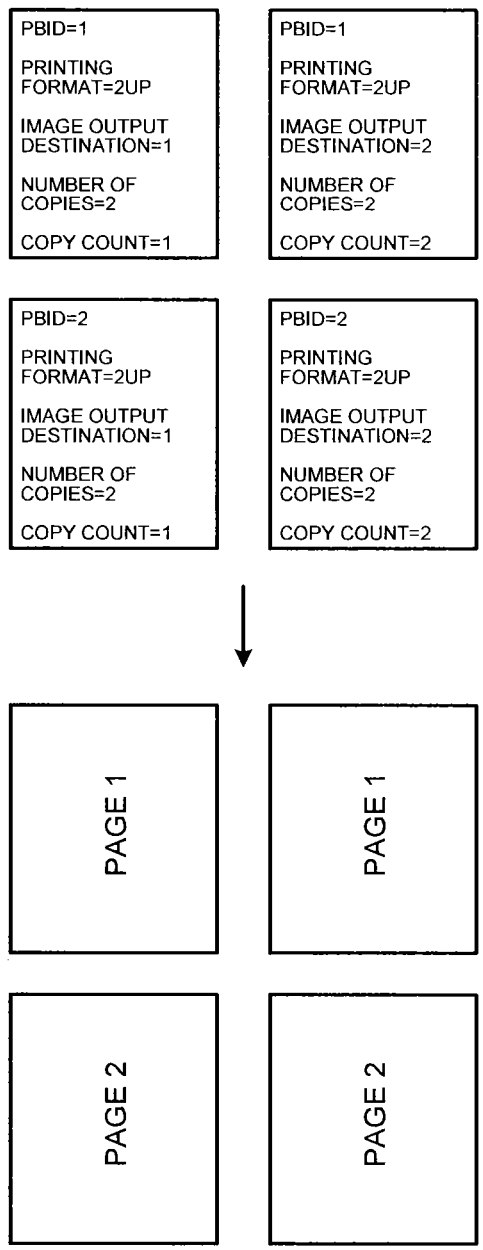
FIG. 15 is an explanatory view illustrating a relationship between the print management tables produced in the sequence illustrated in FIGS. 14A and 14B and pages to be printed.

FIG. 15 illustrates a relationship between the print management tables produced in the sequence illustrated in FIGS. 14A and 14B and the pages to be printed.

Figure 16A:
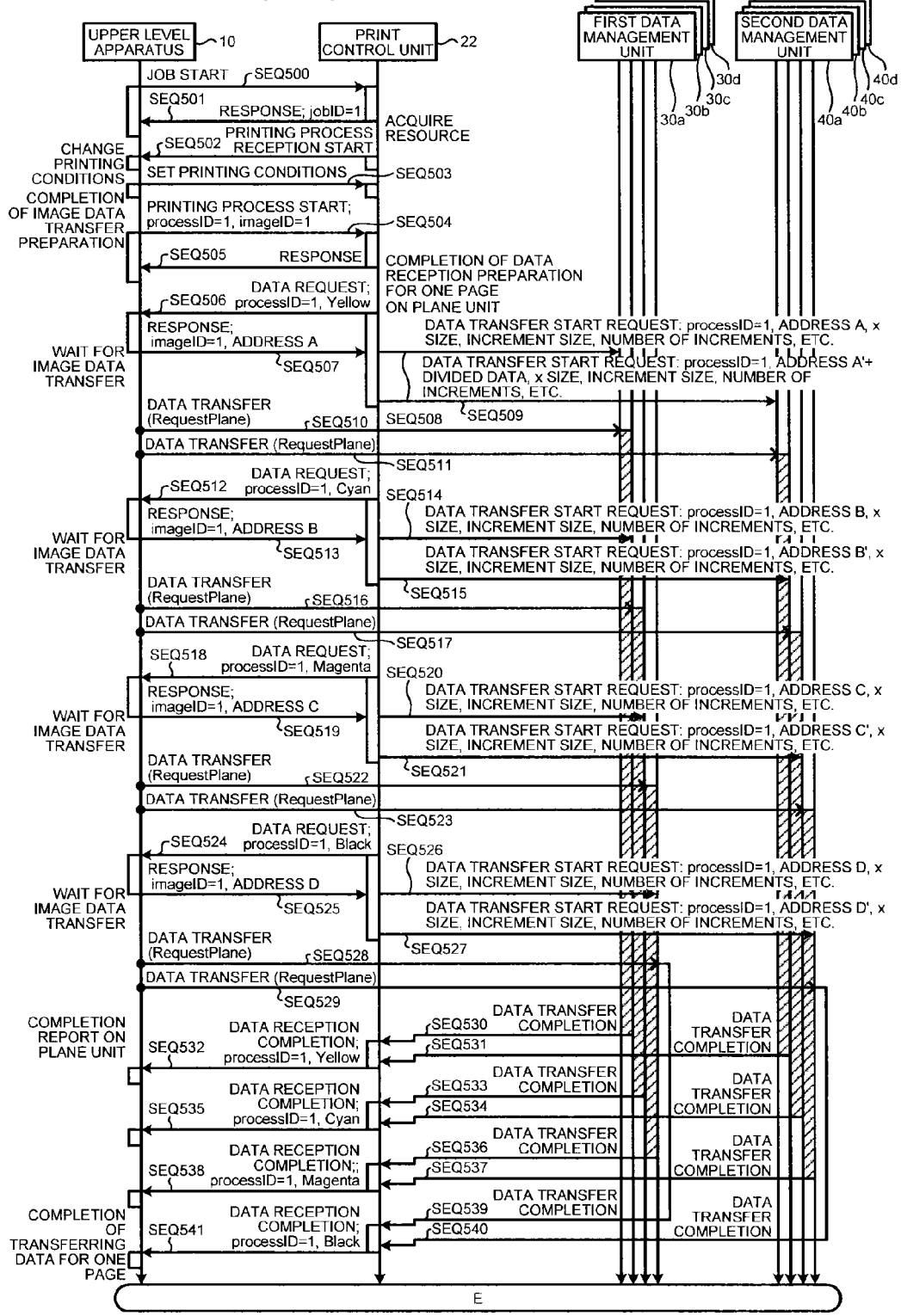
FIG. 16A is a sequence diagram illustrating an example of the continuous page printing performed in the one-up format by the printing system of the embodiment.
Figure 16B:
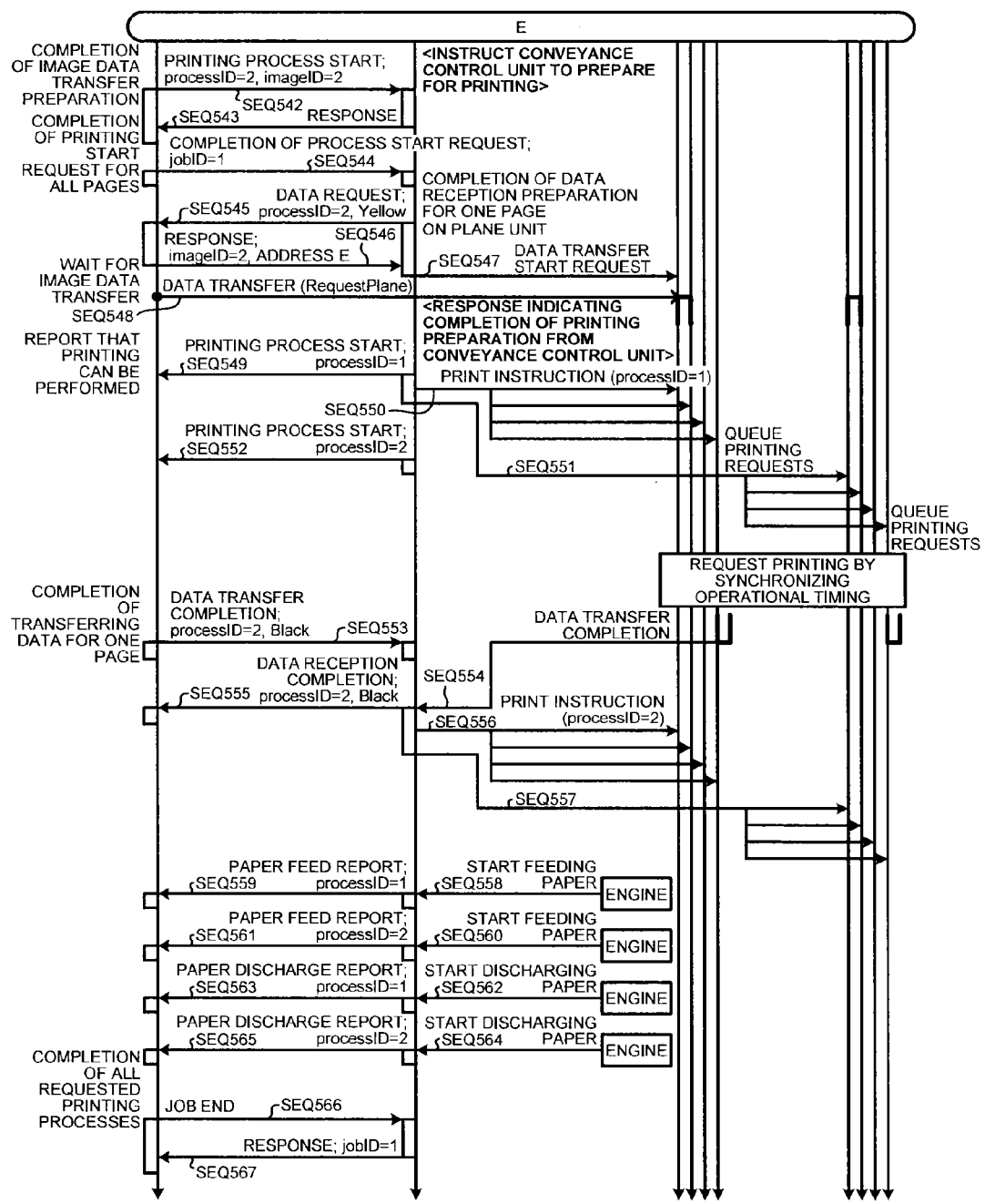
FIG. 16B is a successive sequence diagram illustrating the example of the continuous page printing performed in the one-up format by the printing system of the embodiment.

FIGS. 16A and 16B are sequence diagrams illustrating an example of processing of the continuous page printing in the one-up format by the printing system 1 of the embodiment. Specifically, the sequence diagrams illustrate a sequence of the continuous page printing of pages 1 and 2 by the first printing unit 29 and the second printing unit 39. In FIGS. 16A and 16B, processing transition between the sequence diagrams is indicated with box E.

The processing from SEQ500 to SEQ502 is the same as the processing from SEQ400 to SEQ402 illustrated in FIG. 14A.

Then, the upper level apparatus 10 transmits the control information indicating the printing conditions to the print control unit 22 through the control line 16 and sets the printing conditions (SEQ503). As described above with reference to FIG. 9, the control information indicating the printing conditions includes the printing type, the feeding and discharging information, the printing paper size (e.g., paper width), the image data size, the resolution and the tone, the color information, and the number of copies, for example. The print control unit 22 stores the printing conditions indicated by the received control information in the memory (not illustrated) thereof. The print control unit 22 determines that the printing format is the one-up format using the paper width, which is one of the printing conditions stored in the memory.

Figure 17:
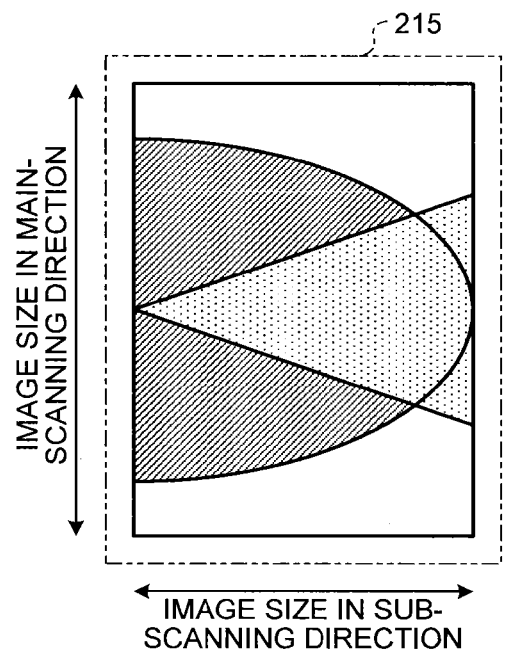
FIG. 17 is an explanatory view illustrating an example of a transfer technique of image data in the continuous page printing performed in the one-up format by the printing system of the embodiment.

After completing the preparation for transferring the image data for page 1, the upper level apparatus 10 transmits the control information indicating the printing process start on page 1 to the print control unit 22 through the control line 16 (SEQ504). As illustrated in FIG. 17, image data 215 is an example of the image data for page 1 for which the transfer preparation is completed. The control information indicating the printing process start includes the processID=1, which is the process identification number to identify this process, and the imageID=1, which is the image identification number to indicate the image to be printed on page 1. Upon receiving the control information indicating the printing process start on page 1, the print control unit 22 produces the print management table of the image data of each color for page 1 using the printing conditions stored in the memory.

The sequence illustrated in FIGS. 16A and 16B is the example of the continuous page printing in the one-up format by the first printing unit 29 and the second printing unit 39. The first head 35 and the second head 45 are connected in series, the number of copies is "1", and the printing format is the one-up format in the print conditions stored in the memory. The print control unit 22, therefore, determines that printing to be performed is the continuous page printing in the one-up format. The print control unit 22 produces two entries of the print management table of the image data of each color for each page. For example, the first entry of the print management table of the image data of each color for page 1 includes the following set values: PBID=1, printing format=one-up format, copy count=1, number of copies=1 (an example of the setting for the continuous page printing), x size=maximum data size that the first printing unit 29 can output in the main-scanning direction, increment size=size of the image data for page 1 in the main-scanning direction, and number of increments=size of the image data for page 1 in the sub-scanning direction. In the embodiment, the print control unit 22 sets the x size to the maximum data size that the first printing unit 29 can output in the main-scanning direction, because the current image output destination managed in the memory of the print control unit 22 is set to "the first printing unit 29". For example, the second entry of the print management table of the image data of each color for page 1 includes the following set values: PBID=1, printing format=one-up format, copy count=1, number of copies=1, x size=size of the image data for page 1 in the main-scanning direction—the maximum data size that the first printing unit 29 can output in the main-scanning direction, increment size=size of the image data for page 1 in the main-scanning direction, and number of increments=size of the image data for page 1 in the sub-scanning direction. At this point of time, the data transfer source address and the image output destination are not yet set in any print management tables of the image data of colors for page 1. The print control unit 22 transmits the control information indicating the printing process start to the upper level apparatus 10 as the response to the control information indicating the printing process start transmitted from the upper level apparatus 10 (SEQ505).

The print control unit 22 transmits the control information indicating the printing process request to the upper level apparatus 10 and requests the image data.

The print control unit 22 transmits the control information indicating the printing process request that requests the image data of color Y for page 1 to the upper level apparatus 10 through the control line 16 (SEQ506). The control information indicating the printing process request includes the processID=1 and the color information Yellow designating color Y. The upper level apparatus 10 transmits the control information indicating the print process request including the imageID=1 and address A, which is the data transfer source address of the image data of color Y for page 1, to the print control unit 22 as the response to the control information indicating the print process request (SEQ507).

Upon receiving the control information indicating the print process request including the imageID=1, the print control unit 22 sets the data transfer source address to address A and the image output destination to 1 in the first entry of the print management table of the image data of color Y for page 1. In the embodiment, the print control unit 22 sets the image output destination to 1 because the current image output destination managed in the memory of the print control unit 22 is set to "the first printing unit 29". Thereafter, the print control unit 22 updates the current image output destination to "the second printing unit 39". The print control unit 22 causes the upper level apparatus 10 to transfer the image data of color Y for page 1 to the first data management unit 30*a* of the first printing unit 29, corresponding to color Y, in accordance with the first entry of the print management table of the image data of color Y for page 1. Specifically, the print control unit 22 refers to the first entry of the print management table of the image data of color Y for page 1, transmits that the processID=1, the data transfer source address=address A, the x size=the maximum data size that the first printing unit 29 can output in the main-scanning direction, the increment size=the size of the image data for page 1 in the main-scanning direction, and the number of increments=the size of the image data for page 1 in the sub-scanning direction to the first data management unit 30*a* of the first printing unit 29, corresponding to color Y, and requests the first data management unit 30*a* to start the transfer of the image data of color Y for page 1 (SEQ508).

Likewise, the print control unit 22 sets the data transfer source address to address A' (address A+the maximum data size that the first printing unit 29 can output in the main-scanning direction) and the image output destination to 2 in the second entry of the print management table of the image data of color Y for page 1. In the embodiment, the print control unit 22 sets the image output destination to 2 because the current image output destination managed in the memory of the print control unit 22 is set to "the second printing unit 39". Thereafter, the print control unit 22 updates the current image output destination to "the first printing unit 29". The print control unit 22 causes the upper level apparatus 10 to transfer the image data of color Y for page 1 to the second data management unit 40*a* of the second printing unit 39, corresponding to color Y, in accordance with the second entry of the print management table of the image data of color Y for page 1. Specifically, the print control unit 22 refers to the second entry of the print management table of the image data of color Y for page 1, transmits that the processID=1, the data transfer source address=address A', the x size=(the size of the image data for page 1 in the main-scanning direction)−(the maximum data size that the first printing unit 29 can output in the main-scanning direction), the increment size=the size of the image data for page 1 in the main-scanning direction, and the number of increments=the size of the image data for page 1 in the sub-scanning direction to the second data management unit 40*a* of the second printing unit 39, corresponding to color Y, and requests the second data management unit 40*a* to start the transfer of the image data of color Y for page 1 (SEQ509).

Figure 18:
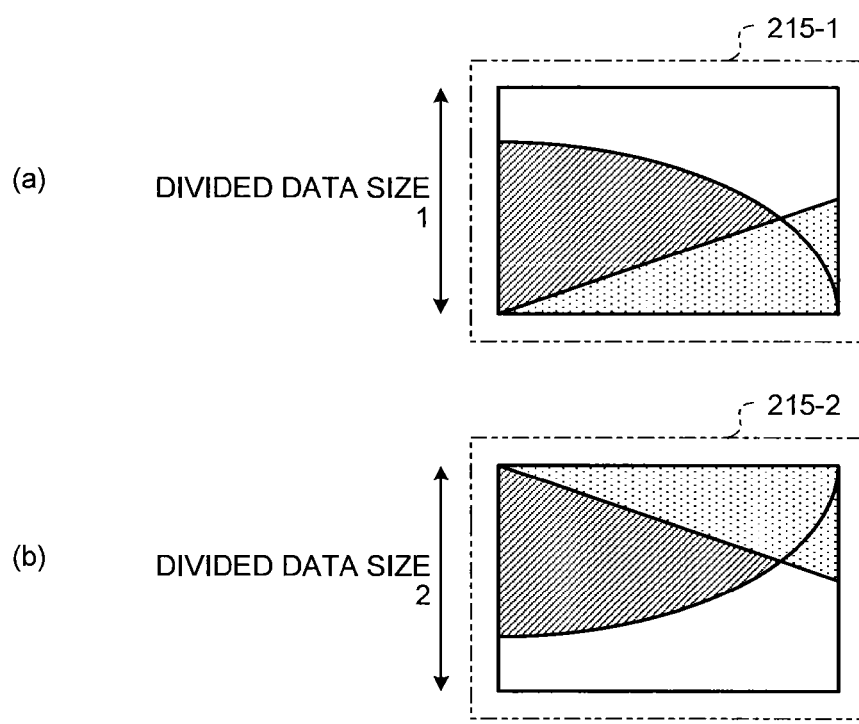
FIG. 18 is an explanatory view illustrating the example of the transfer technique of image data in the continuous page printing performed in the one-up format by the printing system of the embodiment.

Upon receiving the request, the first data management unit 30*a* requests the image data of the plane of color Y for page 1 from the upper level apparatus 10 through the data line 17*a* (not illustrated). As described above, the data transfer source address=address A, the x size=the maximum data size that the first printing unit 29 can output in the main-scanning direction, the increment size=the size of the image data for page 1 in the main-scanning direction, and the number of increments=the size of the image data for page 1 in the sub-scanning direction. Therefore, the first data management unit 30*a* requests from address A data having the maximum data size that the first printing unit 29 can output in the main-scanning direction first. The first data management unit 30*a* then obtains an address (pointer) by incrementing the data having the size of the image data for page 1 in the main-scanning direction from the start of the previously requested data, and repeats processing for requesting data having the maximum data size that the first printing unit 29 can output in the main-scanning direction from the address thus obtained the number of times corresponding to the size of the image data for page 1 in the sub-scanning direction. In response to the request, the upper level apparatus 10 transfers the image data of color Y for page 1 to the first data management unit 30*a*, by being divided by the number of times corresponding to the size of the image data for page 1 in the sub-scanning direction (SEQ510). As a result, when the image data for page 1 for which the transfer preparation is completed in the upper level apparatus 10 is the image data 215 illustrated in FIG. 17, image data 215-2 illustrated in (b) of FIG. 18 is transferred from the upper level apparatus 10 to the first data management unit 30*a*. A divided data size 2 of the image data 215-2 is the maximum data size that the first printing unit 29 can output in the main-scanning direction. The transferred image data is stored in the first memory 31*a* of the first data management unit 30*a*. The first memory 31*a* manages the image data transferred from the upper level apparatus 10 for each processID.

Likewise, upon receiving the request, the second data management unit 40*a* requests the image data of the plane of color Y for page 1 from the upper level apparatus 10 through the data line 18*a* (not illustrated). As described above, the data transfer source address=address A', the x size=(the size of the image data for page 1 in the main-scanning direction)−(the maximum data size that the first printing unit 29 can output in the main-scanning direction), the increment size=the size of the image data for page 1 in the main-scanning direction, and the number of increments=the size of the image data for page 1 in the sub-scanning direction. Therefore, the second data management unit 40*a* requests from address A' the data corresponding to the size of the remainder of the size of the image data for page 1 in the main-scanning direction minus the maximum data size that the first printing unit 29 can output in the main-scanning direction. The second data management unit 40*a* obtains an address (pointer) by incrementing the data corresponding to the size of the image data for page 1 in the main-scanning direction from the start of the previously requested data, and repeats requesting the data corresponding to the size of the remainder of the size of the image data for page 1 in the main-scanning direction minus the maximum data size that the first printing unit 29 can output in the main-scanning direction from the address thus obtained the number of times corresponding to the size of the image data for page 1 in the sub-scanning direction. In response to the request, the upper level apparatus 10 transfers the image data of color Y for page 1 to the second data management unit 40*a*, by being divided by the number of times corresponding to the size of the image data for page 1 in the sub-scanning direction (SEQ511). As a result, when the image data for page 1 for which the transfer preparation is completed in the upper level apparatus 10 is the image data 215 illustrated in FIG. 17, image data 215-1 illustrated in (a) of FIG. 18 is transferred from the upper level apparatus 10 to the second data management unit 40*a*. A divided data size 1 of the image data 215-1 is the size of the remainder of the size of the image data for page 1 in the main-scanning direction minus the maximum data size that the first printing unit 29 can output in the main-scanning direction. The transferred image data is stored in the second memory 41*a* of the second data management unit 40*a*. The second memory 41*a* also manages the image data transferred from the upper level apparatus 10 for each processID.

The processing is repeated on each color of C, M, and K in the same manner as the processing from SEQ506 to SEQ511. The image data of color C for page 1 is transferred to the first data management unit 30*b* from the upper level apparatus 10 through the data line 17*b* and stored in the first memory 31*b* and is also transferred to the second data management unit 40*b* through the data line 18*b* and stored in the second memory 41*b* (SEQ512 to SEQ517). Then, the image data of color M for page 1 is transferred to the first data management unit 30*c* from the upper level apparatus 10 through the data line 17*c* and stored in the first memory 31*c* and is also transferred to the second data management unit 40*c* from the upper level apparatus 10 through the data line 18*c* and stored in the second memory 41*c* (SEQ518 to SEQ523). Then, the image data of color K for page 1 is transferred to the first data management unit 30*d* from the upper level apparatus 10 through the data line 17*d* and stored in the first memory 31*d* and is also transferred to the second data management unit 40*d* from the upper level apparatus 10 through the data line 18*d* and stored in the second memory 41*d* (SEQ524 to SEQ529).

Upon completion of the image data transfer for one plane, the print control unit 22 transmits the control information indicating the completion of receiving the image data to the upper level apparatus 10.

Upon completion of transferring the image data of the plane of color Y for page 1, the upper level apparatus 10 transmits the control information indicating the data transfer completion including the imageID=1 and the color information Yellow to the print control unit 22 (not illustrated). Upon completion of transferring the image data from the upper level apparatus 10 through the data line 17*a*, the first data management unit 30*a* transmits the notification of the completion to the print control unit 22 (SEQ530). Upon completion of transferring the image data from the upper level apparatus 10 through the data line 18*a*, the second data management unit 40*a* transmits the notification of the completion to the print control unit 22 (SEQ531). In response to the notifications, the print control unit 22 transmits the control information indicating the data reception completion including the imageID=1 and the color information Yellow to the upper level apparatus 10 (SEQ532).

Upon completion of transferring the corresponding image data, the processing is repeated for each color of C, M, and K in the same manner as the processing from SEQ530 to SEQ532 and the control information indicating the data reception completion of the corresponding image data is transmitted to the upper level apparatus 10 (SEQ533 to SEQ541).

The description proceeds to the sequence diagram in FIG. 16B, after transmitting the control information indicating the data reception completion of the last image data (image data of color K) for page 1 to the upper level apparatus 10 at SEQ541, the print control unit 22 instructs the conveyance control unit 49 to prepare for printing. The conveyance control unit 49 starts conveying the printing paper to the print position in accordance with the instruction.

After completing the preparation for transferring the image data for page 2, the upper level apparatus 10 transmits the control information indicating the printing process start on page 2 to the print control unit 22 through the control line 16 (SEQ542). The control information indicating the printing process start includes the processID=2, which is the process identification number to identify this process, and the imageID=2, which is the image identification number to indicate the image to be printed on page 2. Upon receiving the control information indicating the printing process start on page 2, the print control unit 22 produces the print management table of the image data for each color for page 2 using the printing conditions stored in the memory.

For example, the first entry of the print management table of the image data of each color for page 2 includes the following set values: PBID=2, printing format=one-up format, copy count=1, number of copies=1, x size=maximum data size that the first printing unit 29 can output in the main-scanning direction, increment size=size of the image data for page 2 in the main-scanning direction, and number of increments=size of the image data for page 2 in the sub-scanning direction. In the embodiment, the print control unit 22 sets the x size to the maximum data size that the first printing unit 29 can output in the main-scanning direction, because the current image output destination managed in the memory of the print control unit 22 is set to "the first printing unit 29". For example, the second entry of the print management table of the image data of each color for page 2 includes the following set values: PBID=2, printing format=one-up format, copy count=1, number of copies=1, x size=(size of the image data for page 2 in the main-scanning direction)−(the maximum data size that the first printing unit 29 can output in the main-scanning direction), increment size=size of the image data for page 2 in the main-scanning direction, and the number of increments=size of the image data for page 2 in the sub-scanning direction. At this point of time, the data transfer source address and the image output destination are not yet set in any print management tables of the image data of colors for page 2. The print control unit 22 transmits the control information indicating the printing process start to the upper level apparatus 10 as the response to the control information indicating the printing process start transmitted from the upper level apparatus 10 (SEQ543).

The printing process start request for performing printing on a total of two pages is completed by the processing at SEQ542 and SEQ543. Upon receiving the response to the printing process start request for page 2 at SEQ543, the upper level apparatus 10 transmits the control information indicating the process start request completion that designates the jobID=1 to the print control unit 22 (SEQ544).

The print control unit 22 transmits the control information indicating the printing process request that requests the image data of color Y for page 2 to the upper level apparatus 10 through the control line 16 (SEQ545). The control information indicating the printing process request includes the processID=2 and the color information Yellow designating color Y. The upper level apparatus 10 transmits the control information indicating the printing process request including the imageID=2 and address E, which is the data transfer source address of the image data of color Y for page 2, to the print control unit 22 as the response to the control information indicating the printing process request (SEQ546).

Upon receiving the control information indicating the printing process request including the imageID=2, the print control unit 22 sets the data transfer source address to address E and the image output destination to 1 in the first entry of the print management table of the image data of color Y for page 2. In the embodiment, the print control unit 22 sets the image output destination to 1 because the current image output destination managed in the memory of the print control unit 22 is set to "the first printing unit 29". Thereafter, the print control unit 22 updates the image output destination to "the second printing unit 39". The print control unit 22 causes the upper level apparatus 10 to transfer the image data of color Y for page 2 to the first data management unit 30*a* of the first printing unit 29, corresponding to color Y, in accordance with the first entry of the print management table of the image data of color Y for page 2. Specifically, the print control unit 22 refers to the first entry of the print management table of the image data of color Y for page 2, transmits that the processID=2, the data transfer source address=address E, the x size=the maximum data size that the first printing unit 29 can output in the main-scanning direction, the increment size=the size of the image data for page 2 in the main-scanning direction, and the number of increments=the size of the image data for page 2 in the sub-scanning direction to the first data management unit 30*a* of the first printing unit 29, corresponding to color Y, and requests the first data management unit 30*a* to start the transfer of the image data of color Y for page 2 (SEQ547).

Likewise, the print control unit 22 sets the data transfer source address to address E' (address E+the maximum data size that the first printing unit 29 can output in the main-scanning direction) and the image output destination to 2 in the second entry of the print management table of the image data of color Y for page 2. In the embodiment, the print control unit 22 sets the image output destination to 2 because the current image output destination managed in the memory of the print control unit 22 is set to "the second printing unit 39". Thereafter, the print control unit 22 updates the current image output destination to "the first printing unit 29". The print control unit 22 causes the upper level apparatus 10 to transfer the image data of color Y for page 2 to the second data management unit 40*a* of the second printing unit 39, corresponding to color Y, in accordance with the second entry of the print management table of the image data of color Y for page 2. Specifically, the print control unit 22 refers to the second entry of the print management table of the image data of color Y for page 2, transmits that the processID=2, the data transfer source address=address E', the x size=(the size of the image data for page 2 in the main-scanning direction)−(the maximum data size that the first printing unit 29 can output in the main-scanning direction), the increment size=the size of the image data for page 2 in the main-scanning direction, and the number of increments=the size of the image data for page 2 in the sub-scanning direction to the second data management unit 40*a* of the second printing unit 39, corresponding to color Y, and requests the second data management unit 40*a* to start the transfer of the image data of color Y for page 2 (not illustrated).

Upon receiving the request, the first data management unit 30*a* requests the image data of the plane of color Y for page 1 from the upper level apparatus 10 through the data line 17*a* (not illustrated). As described above, the data transfer source address=address E, the x size=the maximum data size that the first printing unit 29 can output in the main-scanning direction, the increment size=the size of the image data for page 2 in the main-scanning direction, and the number of increments=the size of the image data for page 2 in the sub-scanning direction. Therefore, the first data management unit 30*a* requests from address E data having the maximum data size that the first printing unit 29 can output in the main-scanning direction first. The first data management unit 30*a* then obtains an address (pointer) by incrementing the data having the size of the image data for page 2 in the main-scanning direction from the start of the previously requested data, and repeats processing for requesting data having the maximum data size that the first printing unit 29 can output from the address thus obtained the number of times corresponding to the size of the image data for page 2 in the sub-scanning direction. In response to the request, the upper level apparatus 10 transfers the image data of color Y for page 2 to the first data management unit 30*a*, by being divided by the number of times corresponding to the size of the image data for page 2 in the sub-scanning direction (SEQ548). The transferred image data is stored in the first memory 31*a* of the first data management unit 30*a*. The first memory 31*a* manages the image data of color Y for page 1 and the image data of color Y for page 2.

Likewise, upon receiving the request, the second data management unit 40*a* requests the image data of the plane of color Y for page 2 from the upper level apparatus 10 through the data line 18*a* (not illustrated). As describe above, the data transfer source address=address E', the x size=(the size of the image data for page 2 in the main-scanning direction)−(the maximum data size that the first printing unit 29 can output in the main-scanning direction), the increment size=the size of the image data for page 2 in the main-scanning direction, and the number of increments=the size of the image data for page 2 in the sub-scanning direction. Therefore, the second data management unit 40*a* requests from address E' the data corresponding to the size of the remainder of the size of the image data for page 2 in the main-scanning direction minus the maximum data size that the first printing unit 29 can output in the main-scanning direction. The second data management unit 40*a* obtains an address (pointer) by incrementing the data corresponding to the size of the image data for page 2 in the main-scanning direction from the start of the previously requested data, and repeats requesting the data corresponding to the size of the remainder of the size of the image data for page 2 in the main-scanning direction minus the maximum data size that the first printing unit 29 can output in the main-scanning direction from the address thus obtained the number of times corresponding to the size of the image data for page 2 in the sub-scanning direction. In response to the request, the upper level apparatus 10 transfers the image data of color Y for page 2 to the second data management unit 40*a*, by being divided by the number of times corresponding to the size of the image data for page 2 in the sub-scanning direction (not illustrated). The transferred image data is stored in the second memory 41*a* of the second data management unit 40*a*. The second memory 41*a* manages the image data of color Y for page 1 and the image data of color Y for page 2.

The processing is repeated on the image data of color C for page 2, on the image data of color M for page 2, and on the image data of color K for page 2 in the same manner as the processing from SEQ545 to SEQ548 (not illustrated).

The upper level apparatus 10 transmits the control information indicating the data transfer completion to the print control unit 22 for each completion of transferring the image data of one plane in the same manner as described above. In response to the control information, the print control unit 22 transmits the control information indicating the completion of receiving the image data to the upper level apparatus 10.

In the example in FIG. 16B, when the transfer of the image data of the plane of color K for page 2 from the upper level apparatus 10 through the data line 17*d* is completed, the first data management unit 30*d* transmits the notification of the completion to the print control unit 22 (SEQ554). When the transfer of the image data of the plane of color K for page 2 from the upper level apparatus 10 through the data line 18*d* is completed, the second data management unit 40*d* transmits the notification of the completion to the print control unit 22 (not illustrated). The print control unit 22 transmits the control information indicating the data reception completion including the imageID=2 and the color information Black to the upper level apparatus 10 in response to the notifications and the control information indicating the data transfer completion of the image data of the plane of color K for page 2 transmitted from the upper level apparatus 10 (not illustrated) (SEQ555).

Upon completion of transferring the corresponding image data, the processing is repeated for each color of Y, C, and M in the same manner as the processing at SEQ554 and SEQ555 and the control information indicating the data reception completion of the corresponding image data is transmitted to the upper level apparatus 10 (not illustrated).

In the example of FIG. 16B, the print control unit 22 instructs the conveyance control unit 49 to prepare for printing after SEQ541. In response to the instruction, the conveyance control unit 49 notifies the print control unit 22 of the completion of the preparation for printing after SEQ548. Upon receiving the notification, the print control unit 22 transmits the control information indicating the printing process start including the processID=1 and the control information indicating the printing process start including the processID=2 to the upper level apparatus (SEQ549 and SEQ552). In this way, the upper level apparatus 10 is notified that pages 1 and 2 can be printed.

In the example of FIG. 16B, the transfer of the image data of each color for page 1 to the first data management units 30*a* to 30*d* and the second data management units 40*a* to 40*d* is completed at SEQ549. Therefore, the print control unit 22 notifies the first data management units 30*a* to 30*d* and the second data management units 40*a* to 40*d* of the print instructions including the processID=1 immediately after SEQ549 (SEQ550 and SEQ551).

Upon completion of transferring the image data of each color for page 2 to the first data management units 30*a* to 30*d* and the second data management units 40*a* to 40*d* (refer to SEQ555), the print control unit 22 notifies the first data management units 30*a* to 30*d* and the second data management units 40*a* to 40*d* of the print instructions including the processID=2 (SEQ556 and SEQ557).

Then, the printer engine 15 prints page 1 in accordance with the print instructions at SEQ550 and SEQ551 and starts the feeding of the printing paper. The printer engine 15 notifies the print control unit 22 of the start of feeding the paper for page 1 (SEQ558). Upon receiving the notification, the print control unit 22 transmits the control information indicating the start of feeding the paper for page 1 and including the processID=1 to the upper level apparatus 10 (SEQ559). Upon starting the feeding of the paper, the printer engine 15 reads out the image data of each color of Y, C, M, and K for page 1 from the respective first memories 31*a* to 31*d* and from the respective second memories 41*a* to 41*d* by synchronizing the operation of the first data management units 30*a* to 30*d* and the second data management units 40*a* to 40*d*. Then, each plane for page 1 is sequentially printed on the printing paper.

The processing is repeated for page 2 in the same manner as the processing at SEQ558 and SEQ559 and each plane for page 2 is sequentially printed on the printing paper (SEQ560 and SEQ561).

When printing of each color for page 1 is completed and the printing paper corresponding to page 1 is discharged, the printer engine 15 notifies the print control unit 22 of the discharge (SEQ562). Upon receiving the notification, the print control unit 22 transmits the control information indicating the discharge of the paper corresponding to page 1 and including the processID=1 to the upper level apparatus 10 (SEQ563).

The processing is repeated for page 2 in the same manner as the processing at SEQ562 and SEQ563 and the control information indicating the discharge of the printing paper corresponding to page 2 is transmitted to the upper level apparatus 10 (SEQ564 and SEQ565).

The processing at SEQ 566 and SEQ 567 is the same as the processing at SEQ466 and SEQ467 illustrated in FIG. 14B.

FIG. 19 illustrates a relationship between the print management tables produced in the sequence illustrated in FIGS. 16A and 16B and the pages to be printed.

Figure 20:
FIG. 20 illustrates a relationship between the print management tables produced in the continuous page printing in the one-up format performed on pages 1 and 2 only by the first printing unit of the printing system of the embodiment and pages to be printed.

FIG. 20 illustrates a relationship between the print management tables produced in the continuous page printing in the one-up format performed on pages 1 and 2 by the first printing unit 29 only. The description thereof is omitted in the embodiment.

Figure 21:
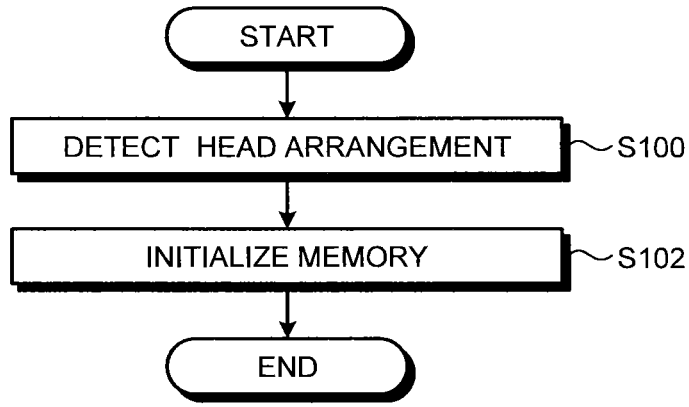
FIG. 21 is a flowchart illustrating an example of initialization processing performed when a power source of a printer of the embodiment is activated.

FIG. 21 is a flowchart illustrating an example of initial processing performed when the power source of the printer 13 of the embodiment is activated. The initial processing is performed prior to the start of the above-described sequences, i.e., the sequence illustrated in FIGS. 11A to 11C, the sequence illustrated in FIGS. 14A and 14B, and the sequence illustrated in FIGS. 16A and 16B.

Upon activation of the power source of the printer 13, the printer engine 15 detects the head arrangement (step S100). Specifically, the printer engine 15 detects whether the first head 35 and the second head 45 are connected in series and arranged in parallel with the conveying direction of the printing paper or whether only the first head 35 is disposed in parallel with the conveying direction of the printing paper, by detecting whether the second printing unit 39 is connected on the basis of the state of a hardware switch, for example.

Then, the print control unit 22 initializes the memory (not illustrated) of the print control unit 22 (step S102).

Figure 22:
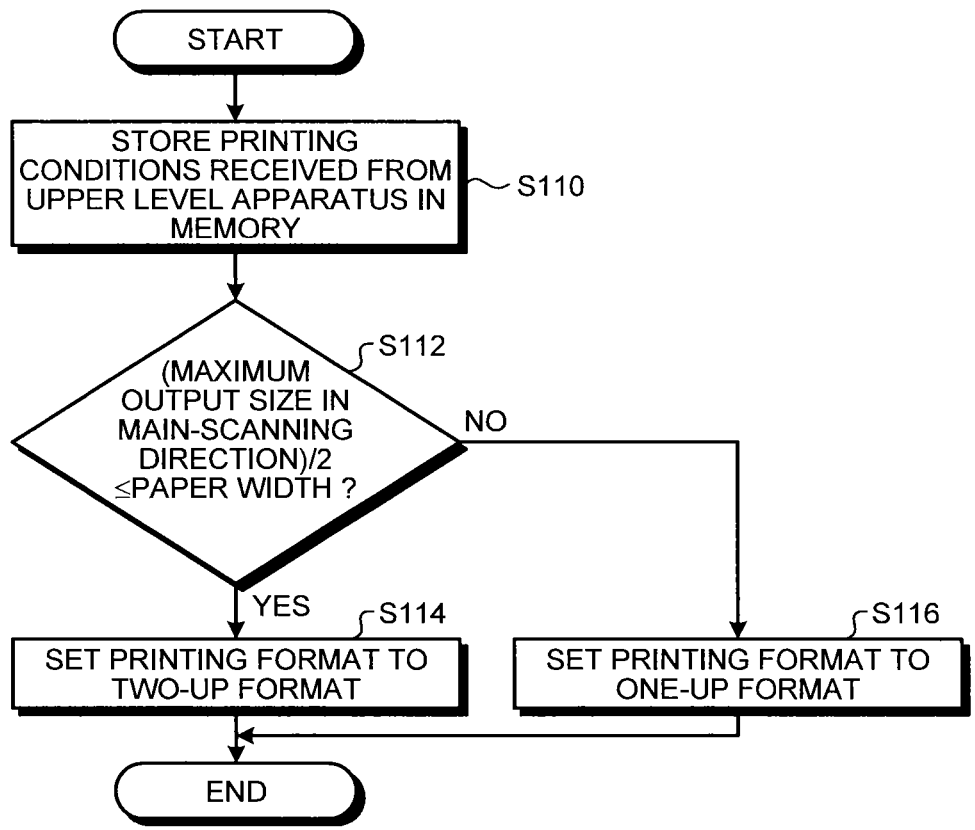
FIG. 22 is a flowchart illustrating an example of printing format determination process performed by a print control unit of the embodiment.

FIG. 22 is a flowchart illustrating an example of printing format determination process performed by the print control unit 22 of the embodiment. The processing is executed at SEQ303 of the sequence illustrated in FIG. 11A, at SEQ403 of the sequence illustrated in FIG. 14A, and at SEQ503 of the sequence illustrated in FIG. 16A, for example.

The print control unit 22 receives the control information indicating the printing conditions from the upper level apparatus 10 through the control line 16 and stores the printing conditions indicated by the received control information in the memory of the print control unit 22 (step S110).

Then, the print control unit 22 confirms whether is the following inequality is satisfied, using the head arrangement detected at step S100 of the flowchart of FIG. 21 and the paper width and the resolution of the printing conditions stored in the memory (step S112):

(the maximum output size in the main-scanning direction)/2≤the paper width

If the above inequality is satisfied (Yes at step S112), the print control unit 22 sets the printing format to the two-up format and stores the set printing format in the memory (step S114).

On the other hand, if the above inequality is not satisfied (No at step S112), the print control unit 22 sets the printing format to the one-up format and stores the set printing format in the memory (step S116).

FIG. 23 is a flowchart illustrating an example of print management table setting process performed by the print control unit 22 of the embodiment. The processing is executed at SEQ309 and SEQ310, SEQ313 and SEQ314, SEQ317 and SEQ318, SEQ321 and SEQ322, SEQ325 and SEQ326, SEQ329 and SEQ330, SEQ333 and SEQ334, and SEQ337 and SEQ338 of the sequence illustrated in FIG. 11A, and at SEQ362 and SEQ363 of the sequence illustrated in FIG. 11B, for example. That is, the processing is executed when the first head 35 and the second head 45 are connected in series and arranged in parallel with the conveying direction of the printing paper, the printing format is the two-up format, and the number of copies of the printing conditions stored in the memory is "1".

Before executing the print management table setting process illustrated in FIG. 23, the print control unit 22 produces the print management table of each color for an applicable page to be processed. For example, the following values are set in the print management table: PBID=ID of the applicable page, printing format=two-up format, copy count=1, number of copies=1, x size=size of image data for the page, increment size=0, and number of increments=1.

Upon receiving the control information indicating the printing process request from the upper level apparatus 10, the print control unit 22 confirms whether the current image output destination managed in the memory of the print control unit 22 is set to "the first printing unit 29", which indicates that printing is performed by the first printing unit 29 (step S130).

If the current image output destination managed in the memory of the print control unit 22 is set to "the first printing unit 29" (Yes at step S130), the print control unit 22 sets the data transfer source address to the address received from the upper level apparatus 10 and the image output destination to 1 in the print management table of the image data for an applicable color to be printed so as to set the print management table of the image data for the applicable color for the first printing unit 29 (step S132). Thereafter, the print control unit 22 updates the image output destination to "the second printing unit 39" (not illustrated). The print control unit 22 requests the first printing unit 29 to start the transfer of the image data of the applicable color for the applicable page on the basis of the print management table of the image data of the applicable color for the first printing unit 29 (step S134).

On the other hand, if the current image output destination managed in the memory of the print control unit 22 is not set to "the first printing unit 29" (when the current image output destination managed in the memory of the print control unit 22 is set to "the second printing unit 39") (No at step S130), the print control unit 22 sets the data transfer source address to the address received from the upper level apparatus 10 and the image output destination to 2 in the print management table of the image data for an applicable color to be printed so as to set the print management table of the image data for the applicable color for the second printing unit 39 (step S136). Thereafter, the print control unit 22 updates the current image output destination to "the first printing unit 29" (not illustrated). The print control unit 22 requests the second printing unit 39 to start the transfer of the image data of the applicable color for the applicable page on the basis of the print management table of the image data of the applicable color for the second printing unit 39 (step S138).

FIG. 24 is a flowchart illustrating an example of the print management table setting process performed by the print control unit 22 of the embodiment. The processing is executed from SEQ407 to SEQ409, from SEQ413 to SEQ415, from SEQ419 to SEQ421, and from SEQ425 to SEQ427 of the sequence illustrated in FIG. 14A, at SEQ446 and SEQ447 of the sequence illustrated in FIG. 14B, from SEQ507 to SEQ509, from SEQ513 to SEQ515, from SEQ519 to SEQ521, and from SEQ525 to SEQ527 of the sequence illustrated in FIG. 16A, and at SEQ546 and SEQ547 of the sequence illustrated in FIG. 16B, for example. That is, the processing is executed when the first head 35 and the second head 45 are connected in series and arranged in parallel with the conveying direction of the printing paper, the printing format is the two-up format, the number of copies in the printing conditions stored in the memory of the print control unit 22 is equal to or more than 2, for example "2", and when the first head 35 and the second head 45 are connected in series and arranged in parallel with the conveying direction of the printing paper and the printing format is the one-up format, for example.

The print management table setting process will be described below when the first head 35 and the second head 45 are connected in series and arranged in parallel with the conveying direction the printing paper, the printing format is the two-up format, and the number of copies of the printing conditions stored in the memory is "2".

Before executing the print management table setting process illustrated in FIG. 24, the print control unit 22 produces two entries of the print management table of each color for an applicable page to be processed. For example, the following values are set in the first entry of the print management table: PBID=ID of the applicable page, printing format=two-up format, copy count=1, number of copies=2, x size=size of the image data for the applicable page, increment size=0, and number of increments=1. For example, the following values are set in the second entry of the print management table: PBID=ID of the applicable page, printing format=two-up format, copy count=2, number of copies=2, x size=size of the image data for the applicable page, increment size=0, and number of increments=1.

Upon receiving the control information indicating the printing process request from the upper level apparatus 10, the print control unit 22 sets the data transfer source address to the address received from the upper level apparatus 10 and the image output destination to 1 in the first entry of the print management table of the image data of an applicable color to be printed so as to set the print management table of the image data of the applicable color for the first printing unit 29 (step S140). In this case, the current image output destination managed in the memory of the print control unit 22 is set to "the first printing unit 29", which indicates that printing is performed by the first printing unit 29. Thereafter, the print control unit 22 updates the current image output destination to "the second printing unit 39" (not illustrated). The print control unit 22 requests the first printing unit 29 to start the transfer of the image data of the applicable color for the applicable page on the basis of the print management table of the image data of the applicable color for the first printing unit 29 (step S142).

Then, the print control unit 22 sets the data transfer source address to the address received from the upper level apparatus 10 and the image output destination to 2 in the second entry of the print management table of the image data of an applicable color to be printed so as to set the print management table of the image data of the applicable color for the second printing unit 39 (step S144). Thereafter, the print control unit 22 updates the image output destination to "the first printing unit 29" (not illustrated). The print control unit 22 requests the second printing unit 39 to start the transfer of the image data of the applicable color for the applicable page on the basis of the print management table of the image data of the applicable color for the second printing unit 39 (step S146).

The print management table setting process will be described below when the first head 35 and the second head 45 are connected in series and arranged in parallel with the conveying direction of the printing paper, the printing format is the one-up format, and the number of copies of the printing conditions stored in the memory is "1".

Before executing the print management table setting process illustrated in FIG. 24, the print control unit 22 produces two entries of the print management table of each color for an applicable page to be processed. For example, the following values are set in the first entry of the print management table: PBID=ID of the applicable page, printing format=one-up format, copy count=1, number of copies=1, x size=maximum data size that the first printing unit 29 can output in the main-scanning direction, increment size=size of the image data of the applicable page in the main-scanning direction, and number of increments=size of the image data of the applicable page in the sub-scanning direction. For example, the following values are set in the second entry of the print management table: PBID=ID of the applicable page, printing format=one-up format, copy count=1, number of copies=2, x size=(size of the image data for the applicable page in the main-scanning direction)−(the maximum data size that the first printing unit 29 can output in the main-scanning direction), increment size=size of the image data for the applicable page in the main-scanning direction, and number of increments=size of the image data for the applicable page in the sub-scanning direction.

Upon receiving the control information indicating the printing process request from the upper level apparatus 10, the print control unit 22 sets the data transfer source address to the address received from the upper level apparatus 10 and the image output destination to 1 in the first entry of the print management table of the image data of an applicable color to be printed so as to set the print management table of the image data of the applicable color for the first printing unit 29 (step S140). In this case, the current image output destination managed in the memory of the print control unit 22 is set to "the first printing unit 29", which indicates that printing is performed by the first printing unit 29. Thereafter, the print control unit 22 updates the current image output destination to "the second printing unit 39" (not illustrated). The print control unit 22 requests the first printing unit 29 to start the transfer of the image data of the applicable color for the applicable page on the basis of the print management table of the image data of the applicable color for the first printing unit 29 (step S142).

Then, the print control unit 22 sets that the data transfer source address=(the address received from the upper level apparatus 10)+(the maximum data size that the first printing unit 29 can output in the main-scanning direction) and sets the image output destination to 2 in the second entry of the print management table of the image data of an applicable color to be printed so as to set the print management table of the image data of the applicable color for the second printing unit 39 (step S144). Thereafter, the print control unit 22 updates the image output destination to "the first printing unit 29" (not illustrated). The print control unit 22 requests the second printing unit 39 to start the transfer of the image data of the applicable color for the applicable page on the basis of the print management table of the image data of the applicable color for the second printing unit 39 (step S146).

In the embodiment, printing can be performed by attaching the second printing unit 39 to the printer engine 15. As a result, printing productivity can be increased without increasing a conveying speed of printing paper. Particularly, in the embodiment, the upper level apparatus 10 transfers image data to the first image management units 30*a* to 30*d* and the second data management units 40*a* to 40*d* on the basis of the print management table produced by the print control unit 22. The upper level apparatus 10 transfers the image data simply in accordance with the contents set in the print management table regardless of the presence or absence of the second printing unit 39. That is, no changes need to be added to the items controlled by the upper level apparatus 10 even when the second printing unit 39 is attached to the printer engine 15. As a result, according to the embodiment, printing productivity can be further increased by simple control. In addition, according to the embodiment, the attachment of the second printing unit 39 to the printer engine 15 allows printing in a wider width than a conventional print size.

Modified Example

The present invention is not limited to the above-described embodiment and various modifications can be made. In the embodiment, the print control unit 22 notifies the first data management units 30*a* to 30*d* and the second data management units 40*a* to 40*d* of the contents of the respective print management tables, and the first data management units 30*a* to 30*d* and the second data management units 40*a* to 40*d* request the upper level apparatus 10 to transfer the image data in accordance with the notified contents. The transfer technique of the image data is not limited to that described in the embodiment. The print control unit 22 may notify the upper level apparatus 10 of the contents of the print management tables, and the upper level apparatus 10 may transfer the image data to the first data management units 30*a* to 30*d* and the second data management units 40*a* to 40*d* in accordance with the notified contents.

According to the embodiment, it is possible to further increase printing productivity by simple control.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing apparatus, comprising:
a controller; and
an engine including a first printing unit and a second printing unit, wherein
the first printing unit includes
a first data management unit configured to manage a piece of first image data transferred from an upper level apparatus,
one or more first output units, and
a first output control unit configured to output a first image based on the piece of first image data to one of the one or more first output units,
the second printing unit includes
a second data management unit configured to manage a piece of second image data transferred from the upper level apparatus,
one or more second output units, and
a second output control unit configured to output a second image based on the piece of second image data to one of the one or more second output units, and
the controller is configured to
receive control information indicating a printing condition from the upper level apparatus,
produce a first print management table for the piece of first image data and a second print management table for the piece of second image data, on the basis of the control information,
cause the upper level apparatus to transfer the piece of first image data to the first data management unit on the basis of the first print management table, and
cause the upper level apparatus to transfer the piece of second image data to the second data management unit on the basis of the second print management table,
wherein:
each of the first output units is connected to each of the second output units in series,
the first output units are arranged in parallel with a conveying direction of printing paper,
the second output units are arranged in parallel with the conveying direction,
the printing condition includes a paper width of the printing paper,
the controller determines, on the basis of the paper width and a maximum output size in a main-scanning direction of the first output unit and the second output unit connected in series, whether page layout printing or normal printing is performed using the first printing unit and the second printing unit,
the controller sets the page layout printing in the first print management table and the second print management table if determining that the page layout printing is performed, and sets the normal printing in the first print management table and the second print management table if determining that the normal printing is performed,
the printing condition includes a number of copies,
the controller determines whether continuous page printing for continuously printing pages or copy page printing for printing and copying a page, the controller sets the continuous page printing in the first print management table and the second print management table if determining that the continuous page printing is performed, and sets the copy page printing in the first print management table and the second print management table if determining that the copy page printing is performed, when the normal printing is performed, each of the piece of first image data and the piece of second image data is image data for an identical page, the printing condition includes a size of the image data for the identical page, and the controller receives control information indicating a starting address of the image data for the identical page from the upper level apparatus, sets, in the first print management table, first requests repeated the number of times corresponding to a size of the image data in a sub-scanning direction, the first requests including an initial request of data having a maximum data size of the first output unit in the main-scanning direction from the starting address of the image data and following requests of data having the maximum data size of the first output unit in the main-scanning direction from an address incremented by the size of the image data in the main-scanning direction from a start of the previously requested data, and sets, in the second print management table, second requests repeated the number of times corresponding to the size of the image data in the sub-scanning direction, the second requests including an initial request of data corresponding to a size of a remainder of the size of the image data in the main-scanning direction minus the maximum data size of the first output unit in the main-scanning direction from an address incremented by the data having the maximum data size of the first output unit in the main-scanning direction from the starting address of the image data and following requests of data having a size of a remainder of the size of the image data in the main-scanning direction minus the maximum data size of the first output unit in the main-scanning direction from an address incremented by the size of the image data in the main-scanning direction from a start of the previously requested data.

2. The printing apparatus according to claim 1, wherein when both the page layout printing and the continuous page printing are performed, the piece of first image data and the piece of second image data are image data for different pages from each other, the printing condition includes sizes of the piece of first image data and the piece of second image data serving as the image data for the respective pages, and the controller receives control information indicating starting addresses of the piece of first image data and the piece of second image data from the upper level apparatus, sets that data corresponding to the size of the piece of first image data is transferred from the starting address of the piece of first image data in the first print management table, and sets that data corresponding to the size of the piece of second image data is transferred from the starting address of the piece of second image data in the second print management table.

3. The printing apparatus according to claim 1, wherein when both the page layout printing and the copy page printing are performed, each of the piece of first image data and the piece of second image data is image data for an identical page, the printing condition includes a size of the image data for the identical page, and the controller receives control information indicating a starting address of the image data for the identical page from the upper level apparatus, and sets that data corresponding to the size of the image data is transferred from the starting address of the image data in each of the first print management table and the second print management table.

4. The printing apparatus according to claim 1, wherein the second printing unit is attached to the engine in a detachable manner, and the controller produces the second print management table when the second printing unit is attached to the engine.

5. A printing method for a printing apparatus including a controller and an engine including a first printing unit and a second printing unit, the method comprising:

outputting, using a first output control unit, to one or more first output units a first image based on a piece of first image data transferred from an upper level apparatus;

outputting, using a second output control unit, to one or more second output units a second image based on a piece of second image data transferred from the upper level apparatus;

receiving control information indicating a printing condition from the upper level apparatus;

producing a first print management table for the piece of first image data and a second print management table for the piece of second image data, on the basis of the control information;

causing the upper level apparatus to transfer the piece of first image data to a first data management unit on the basis of the first print management table; and causing the upper level apparatus to transfer the piece of second image data to a second data management unit on the basis of the second print management table wherein:

each of the first output units is connected to each of the second output units in series, the first output units are arranged in parallel with a conveying direction of printing paper, the second output units are arranged in parallel with the conveying direction, the printing condition includes a paper width of the printing paper, the controller determines, on the basis of the paper width and a maximum output size in a main-scanning direction of the first output unit and the second output unit connected in series, whether page layout printing or normal printing is performed using the first printing unit and the second printing unit, the controller sets the page layout printing in the first print management table and the second print management table if determining that the page layout printing is performed, and sets the normal printing in the first print management table and the second print management table if determining that the normal printing is performed, the printing condition includes a number of copies, the controller determines whether continuous page printing for continuously printing pages or copy page printing for printing and copying a page, the controller sets the continuous page printing in the first print management table and the second print management table if determining that the continuous page printing is performed, and sets the copy page printing in the first print management table and the second print management table if determining that the copy page printing is performed, when the normal printing is performed, each of the piece of first image data and the piece of second image data is image data for an identical page, the printing condition includes a size of the image data for the identical page, and the controller receives control information indicating a starting address of the image data for the identical page from the upper level apparatus, sets, in the first print management table, first requests repeated the number of times corresponding to a size of the image data in a sub-scanning direction, the first requests including an initial request of data having a maximum data size of the first output unit in the main-scanning direction from the starting address of the image data and following requests of data having the maximum data size of the first output unit in the main-scanning direction from an address incremented by the size of the image data in the main-scanning direction from a start of the previously requested data, and sets, in the second print management table, second requests repeated the number of times corresponding to the size of the image data in the sub-scanning direction, the second requests including an initial request of data corresponding to a size of a remainder of the size of the image data in the main-scanning direction minus the maximum data size of the first output unit in the main-scanning direction from an address incremented by the data having the maximum data size of the first output unit in the main-scanning direction from the starting address of the image data and following requests of data having a size of a remainder of the size of the image data in the main-scanning direction minus the maximum data size of the first output unit in the main-scanning direction from an address incremented by the size of the image data in the main-scanning direction from a start of the previously requested data.

* * * * *